(12) United States Patent
Yang et al.

(10) Patent No.: US 10,886,856 B2
(45) Date of Patent: Jan. 5, 2021

(54) POWER CONVERTER AND POWER CONVERTER CONTROL METHOD

(71) Applicant: DELTA ELECTRONICS, INC., Taoyuan (TW)

(72) Inventors: Chia-Cheng Yang, Taoyuan (TW); Chen-Bin Huang, Taoyuan (TW); Jui-Teng Chan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/745,313

(22) Filed: Jan. 16, 2020

(65) Prior Publication Data

US 2020/0161983 A1 May 21, 2020

Related U.S. Application Data

(63) Continuation-in-part of application No. 16/149,152, filed on Oct. 2, 2018, now Pat. No. 10,574,138.
(Continued)

(30) Foreign Application Priority Data

Jun. 21, 2018 (CN) .......................... 2018 1 0642039
Aug. 6, 2019 (CN) .......................... 2019 1 0721754

(51) Int. Cl.
*H02M 3/335* (2006.01)
*H02M 1/32* (2007.01)
(Continued)

(52) U.S. Cl.
CPC ......... *H02M 3/33576* (2013.01); *H02M 1/08* (2013.01); *H02M 1/32* (2013.01); *H02M 2001/0009* (2013.01)

(58) Field of Classification Search
CPC .. H02M 3/335; H02M 3/33576; H02M 3/156; H02M 3/1563; H02M 3/158; H02M 2001/0009; H02M 2001/0025; H02M 1/00

See application file for complete search history.

(56) References Cited

U.S. PATENT DOCUMENTS 6,191,567 B1  2/2001  Sluijs
6,636,431 B2  10/2003  Seki et al.
(Continued)

FOREIGN PATENT DOCUMENTS

CN  103959625 A  7/2014
CN  104600780 A  5/2015
(Continued)

*Primary Examiner* — Thienvu V Tran
*Assistant Examiner* — Nusrat Quddus
(74) *Attorney, Agent, or Firm* — CKC & Partners Co., LLC

(57) ABSTRACT

A power converter includes a power converting circuit, an output current control circuit, a high-voltage control circuit, a low-voltage control circuit, and a driving circuit. The power converting circuit receives and converts a HV dc voltage from a HV side to a LV dc voltage to a LV side. The output current control circuit is configured to detect an output current and output a first control signal. The high-voltage control circuit is configured to detect the HV dc voltage and output a second control signal. The low-voltage control circuit is configured to detect the LV dc voltage and output a third control signal selectively according to the LV dc voltage, or the LV dc voltage and the first control signal, or the LV dc voltage and the second control signal. The driving voltage outputs a driving signal to drive the power converting circuit according to the third control signal.

20 Claims, 14 Drawing Sheets

Related U.S. Application Data

(60) Provisional application No. 62/567,593, filed on Oct. 3, 2017.

(51) Int. Cl.
  *H02M 1/08* (2006.01)
  *H02M 1/00* (2006.01)

(56) References Cited

U.S. PATENT DOCUMENTS

| | | |
|---|---|---|
| 7,265,524 B2 | 9/2007 | Jordan et al. |
| 8,018,212 B1 | 9/2011 | Petricek |
| 8,179,113 B2 | 5/2012 | Singnurkar |
| 8,258,765 B2 | 9/2012 | Nishida |
| 8,269,472 B2 | 9/2012 | Lin |
| 8,723,490 B2 | 5/2014 | Moussaoui et al. |
| 9,312,773 B2 | 4/2016 | Li |
| 9,425,689 B2 | 8/2016 | Li et al. |
| 9,490,704 B2 | 11/2016 | Jang et al. |
| 9,673,704 B2 | 6/2017 | Franchini et al. |
| 2005/0258814 A1* | 11/2005 | Chen ............... H02M 3/1588 323/285 |
| 2009/0322298 A1* | 12/2009 | Nishida ............ H02M 3/1588 323/282 |
| 2012/0007431 A1* | 1/2012 | Jang ..................... H02J 4/00 307/82 |
| 2012/0049772 A1* | 3/2012 | Moussaoui ........ H02M 3/1588 318/376 |
| 2012/0081086 A1* | 4/2012 | Van Dijk ............ H02M 3/158 323/273 |
| 2014/0252950 A1* | 9/2014 | Kikuchi ................ B60Q 1/00 315/77 |
| 2014/0300336 A1* | 10/2014 | Li ..................... H02M 3/156 323/285 |
| 2015/0061611 A1* | 3/2015 | Li ..................... H03K 17/063 323/235 |
| 2015/0244167 A1* | 8/2015 | Tsao ..................... H02J 7/342 361/93.1 |
| 2016/0229298 A1* | 8/2016 | Chen ..................... B60L 11/18 |
| 2016/0233768 A1* | 8/2016 | de Cremoux ....... H02M 3/1588 |
| 2016/0276940 A1* | 9/2016 | Inoue .................... H02M 1/08 |
| 2016/0380455 A1 | 12/2016 | Greening et al. |
| 2018/0226877 A1* | 8/2018 | Fukumoto .......... H02M 3/1588 |

FOREIGN PATENT DOCUMENTS

| | | |
|---|---|---|
| TW | 200701611 A | 1/2007 |
| TW | I470914 B | 1/2015 |
| TW | M543799 U | 6/2017 |

* cited by examiner

POWER CONVERTER AND POWER CONVERTER CONTROL METHOD

RELATED APPLICATIONS

This application is a Continuation-in-part of U.S. application Ser. No. 16/149,152, filed on Oct. 2, 2018, which claims priority to China Application Serial Number 201810642039.1, filed Jun. 21, 2018 and U.S. Provisional Application Ser. No. 62/567,593, filed Oct. 3, 2017. This present application also claims priority to China Application Serial Number 201910721754.9, filed Aug. 6, 2019. All of these applications are herein incorporated by reference.

BACKGROUND

Technical Field

The disclosure relates to a power converter and power converter control method, particularly to a power converter and power converter control method for converting high voltage to low voltage.

Description of Related Art

Recently, with the improvement of environmental awareness, electric vehicles (EVES), Hybrid Electric Vehicles (HEMS), or Plug-in Hybrid Electric Vehicles (PHEN), which use electric energy as a power source, are more and more popular.

Usually the HEMS are equipped with a set of high-voltage batteries and a set of low-voltage batteries, however, when the high-voltage batteries fail abnormally or do not work at very low temperatures, the generator in the system may not be able to balance the voltage, resulting in the whole system stops working due to overvoltage or under voltage, which causes the problems, such as reliability of the system to drop and the vehicle not traveling.

Therefore, how to improve the power converting system is one of the important issues in this field.

SUMMARY

One aspect of the present disclosure is a power converter. The power converter includes a power converting circuit, an output current control circuit, a high-voltage control circuit, a low-voltage control circuit and a driving circuit. The power converting circuit is configured to receive a High Voltage Direct Current voltage from a high-voltage side, to convert the High Voltage Direct Current voltage to a Low Voltage Direct Current voltage and to output the Low Voltage Direct Current voltage to a low-voltage side. The output current control circuit is electrically coupled to the low-voltage side, and configured to detect an output current of the power converting circuit and to output a first control signal according to the output current. The high-voltage control circuit is electrically coupled to the high-voltage side, and configured to detect the High Voltage Direct Current voltage and to output a second control signal according to the High Voltage Direct Current voltage. The low-voltage control circuit is electrically coupled to the low-voltage side, and configured to detect the Low Voltage Direct Current voltage and to output a third control signal selectively according to the Low Voltage Direct Current voltage, or the Low Voltage Direct Current voltage and the first control signal, or the Low Voltage Direct Current voltage and the second control signal. The driving circuit is electrically coupled to the low-voltage control circuit, and configured to output a driving signal to drive the power converting circuit according to the third control signal.

Another aspect of the present disclosure is a power converter. The power converter includes a high-voltage side, a low-voltage side, a power converting circuit, an output current control circuit, a high-voltage control circuit, a low-voltage control circuit and a driving circuit. The high-voltage side is configured to electrically couple with a High Voltage Direct Current source output. The low-voltage side is configured to electrically couple with a Low Voltage Direct Current load. The power converting circuit is configured to receive a High Voltage Direct Current voltage from the high-voltage side and to convert the High Voltage Direct Current voltage to a Low Voltage Direct Current voltage to the low-voltage side. The output current control circuit is electrically coupled to the low-voltage side, and configured to detect an output current of the power converting circuit and to output a first control signal according to the output current. The high-voltage control circuit is electrically coupled to the high-voltage side, and configured to detect the High Voltage Direct Current voltage and to output a second control signal according to the High Voltage Direct Current voltage. The low-voltage control circuit is electrically coupled to the low-voltage side, and configured to detect the Low Voltage Direct Current voltage and output a third control signal according to the Low Voltage Direct Current voltage. The driving circuit is configured to selectively output a driving signal to drive the power converting circuit according to at least one of the first control signal, the second control signal or the third control signal.

Another aspect of the present disclosure is a power converter control method, includes: converting, by a power converting circuit, a High Voltage Direct Current voltage from a high-voltage side to a Low Voltage Direct Current voltage, and outputting the Low Voltage Direct Current voltage to a low-voltage side; selectively activating, by a processing circuit, a low-voltage control circuit, or an output current control circuit and the low-voltage control circuit, or a high-voltage control circuit and the low-voltage control circuit; if the output current control circuit is activated, detecting, by the output current control circuit, an output current of the power converting circuit, and outputting a first control signal to the low-voltage control circuit according to the output current; if the high-voltage control circuit is activated, detecting, by the high-voltage control circuit, the High Voltage Direct Current voltage, and outputting a second control signal to the low-voltage control circuit according to the High Voltage Direct Current voltage; if the low-voltage control circuit is activated, detecting, by the low-voltage control circuit, the Low Voltage Direct Current voltage, and outputting a third control signal; and outputting, by a driving circuit, a driving signal according to the third control signal to drive the power converting circuit, and controlling the Low Voltage Direct Current voltage, the High Voltage Direct Current voltage or the output current corresponding to the third control signal.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the diagrams, some of the conventional structures and elements are shown with schematic illustrations.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
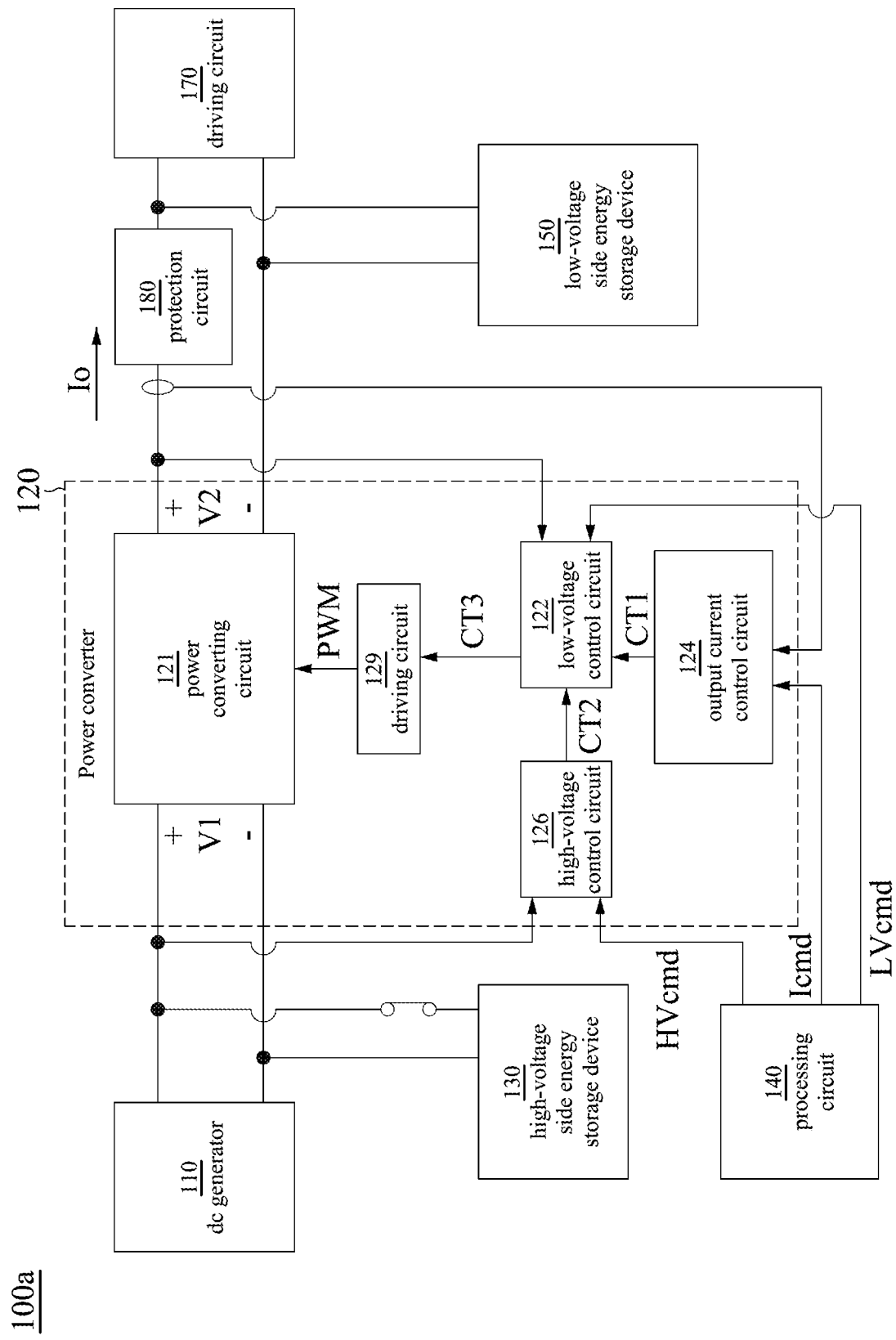
FIG. 1 is a schematic diagram illustrating a power converting system in accordance with some embodiments of the disclosure.

Please refer to FIG. 1. FIG. 1 is a schematic diagram illustrating a power converting system 100a in accordance with some embodiments of the disclosure. As shown in FIG. 1, in some embodiments, the power converting system 100a includes a dc generator 110, a power converter 120, a high-voltage side energy storage device 130, a processing circuit 140, a low-voltage side energy storage device 150, and a low-voltage load device 170. In some other embodiments, the power converting system 100a further includes a protection circuit 180. In some embodiments, the power converting system 100a may be used in a Plug-in Hybrid Electric Vehicle (PHEN) or a Hybrid Electric Vehicle (HEV) system, through the cooperation of power converter 120 and the processing circuit 140, converting a High Voltage Direct Current (HVDC) voltage V1 outputted by the dc generator 110 of a high-voltage side to a Low Voltage Direct Current (LVDC) voltage V2, and providing an output current Io to the energy storage device 150 and the low-voltage load device 170 of a low-voltage side. Accordingly, the power required for a load (e.g., various devices in the vehicle system) is able to be provided.

For example, in some embodiments, the HVDC voltage V1 output by the dc generator 110 is approximately 48 volts. The power converter 120 converts the HVDC voltage V1 to the LVDC voltage V2 (e.g., about 12V) to supply power requirements such as an audio system on the vehicle or an on-board electronic device such as driving recorder. It should be noted that the above values and applications are for illustrative purposes only and are not intended to limit the present disclosure.

As shown in FIG. 1, in structure, the power converter 120 includes a power converting circuit 121, a low-voltage control circuit 122, an output current control circuit 124, a high-voltage control circuit 126 and a driving circuit 129. The high-voltage side of the power converting circuit 121 is electrically coupled to the energy storage device 130 and the dc generator 110 of the high-voltage side, the low-voltage side of the power converting circuit 121 is electrically coupled to the energy storage device 150 and the low-voltage load device 170 of the low-voltage side. The power converting circuit 121 is configured to receive the HVDC voltage V1 of the high-voltage side, and to convert the HVDC voltage V1 into the LVDC voltage V2 to output to the low-voltage side of the power converting circuit 121.

Specifically, the power converting circuit 121 is implemented by various switching DC-DC conversion circuits. For example, the power converting circuit 121 may be implemented by a non-isolated converter, such as a buck converter, a buck-boost converter, etc. Or, the power converting circuit 121 may also be implemented by an isolated converter.

Figure 2:
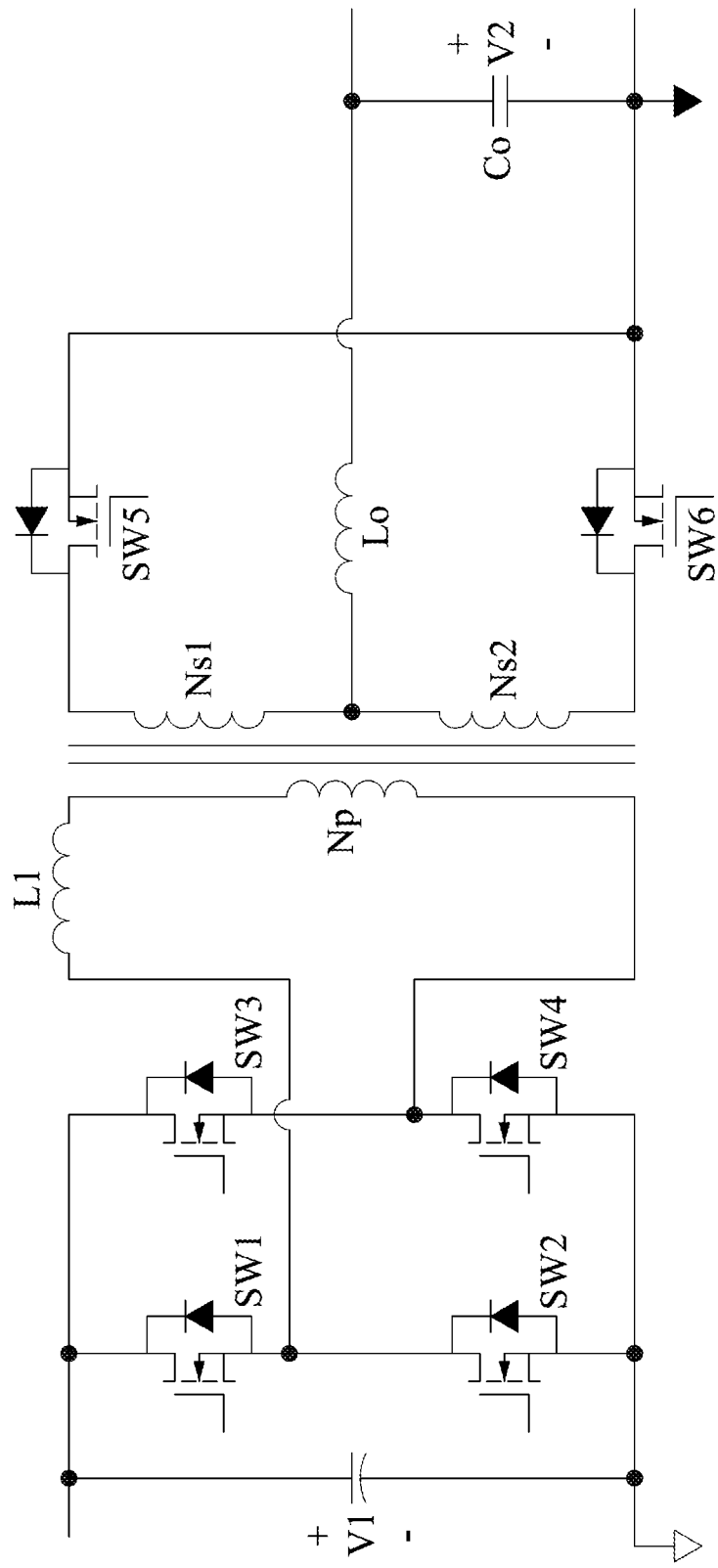
FIG. 2 is a schematic diagram illustrating a power converting circuit in accordance with some embodiments of the disclosure.

FIG. 2 is a schematic diagram illustrating a power converting circuit 121 in accordance with some embodiments of the disclosure. In some embodiments, as shown in FIG. 2, the power converting circuit 121 may be a phase shifted full bridge converter. In this embodiment, the power converting circuit 121 includes switches SW1~SW4, a resonant inductor L1, a transformer, rectifying switches SW5, SW6, an output inductor Lo and an output capacitor Co. A primary side of the transformer includes a set of primary winding Np, and a secondary side of the transformer includes two sets of secondary windings Ns1, Ns2.

In structure, first terminals of the switches SW1, SW3 are electrically coupled to a positive terminal of the HVDC voltage V1, second terminals of the switches SW1, SW3 are electrically coupled to first terminals of the switches SW2, SW4, and second terminals of the switches SW2, SW4 are electrically coupled to a negative terminal of the HVDC voltage V1. The resonant inductor L1 is connected the primary winding Np in series, one terminal of the resonant inductor L1 is electrically coupled between the second terminal of the switch SW1 and the first terminal of the switch SW2, and the other terminal of the resonant inductor L1 is electrically coupled between the second terminal of the switch SW3 and the first terminal of the switch SW4. A beginning terminal of the secondary winding Ns2 is electrically coupled to an ending terminal of the secondary winding Ns1, and the secondary windings Ns1 and Ns2 are electrically coupled to a negative terminal of the output capacitor Co through the rectifying switches SW5 and SW6.

In configurationally, control terminals of the switches SW1~SW4 are configured to receive corresponding driving signals respectively (e.g., the driving signal PWM shown in FIG. 1), so that the LVDC voltage V2 can be regulated according to the driving signals.

It should be noted that the power converting circuit 121 is merely an example, but not intended to limit to the present disclosure. In some other embodiments, the type of power converting circuit 121 and the transformer circuit, the resonance circuit, and the rectifying circuit in the power converting circuit 121 may be completed according to any form well known to those skilled in the art. Please refer to FIG. 1. As shown in FIG. 1, the output current control circuit 124 is electrically coupled to the low-voltage side, and configured to detect the output current Io of the power converting circuit 121, and to output a first control signal CT1 according to the output current Io. The high-voltage control circuit 126 is electrically coupled to the high-voltage side, and configured to detect the HVDC voltage V1 and to output a second control signal CT2 accordingly.

The low-voltage control circuit 122 is electrically coupled to the low-voltage side, the output current control circuit 124 and the high-voltage control circuit 126. The low-voltage control circuit 122 is configured to detect the LVDC voltage V2, and to output a third control signal CT3 to the driving circuit 129 selectively according to the LVDC voltage V2, the LVDC voltage V2 and the first control signal CT1, or the LVDC voltage V2 and the second control signal CT2.

The driving circuit 129 is electrically coupled to the low-voltage control circuit 122, and configured to receive the third control signal CT3 and to output the driving signal PWM according to the third control signal CT3, so as to switch the switches in the power converting circuit 121 to be turned on and off.

In some embodiments, at the same time, the low-voltage control circuit 122 may be activated individually, or the output current control circuit 124 and the low-voltage control circuit 122 may be activated together, or the high-voltage control circuit 126 and the low-voltage control circuit 122 may be activated together. That is, in this embodiment, three feedback loops all include the low-voltage control circuit 122 (i.e., the low-voltage control circuit 122 will keep activated), however, at the same time, merely one of three feedback loops will be activated.

In other words, in a low voltage control mode, the low-voltage control circuit 122 is activated individually and outputs the third control signal CT3, the output current control circuit 124 and the high-voltage control circuit 126 are deactivated. In a low voltage and output current common control mode, the output current control circuit 124 is activated and outputs the first control signal CT1, the low-voltage control circuit 122 is also activated and receives the first control signal CT1 and outputs the third control signal CT3, and the high-voltage control circuit 126 is deactivated. In a low voltage and high voltage common control mode, the high-voltage control circuit 126 is activated and outputs the second control signal CT2, the low-voltage control circuit 122 is also activated and receives the second control signal CT2 and outputs the third control signal CT3, and the output current control circuit 124 is deactivated.

In this way, the power converting system 100 is able to control which one of the output current control circuit 124 and the high-voltage control circuit 126 is activated and which one of them is deactivated, or both of them are deactivated, and to control according to the corresponding commands to the voltage level of the HVDC voltage V1, the voltage level of the LVDC voltage V2 or the current intensity of the output current Io. It should be noted that the activated and deactivated of the control circuit do not represent whether the control circuit is turned off, but merely indicates whether the control circuit is involved in the control.

Further explanation, the processing circuit 140 is electrically coupled to the low-voltage control circuit 122, the output current control circuit 124 and the high-voltage control circuit 126. The processing circuit 140 outputs a low-voltage command LVcmd, an output current command Icmd and a high-voltage command HVcmd to the low-voltage control circuit 122, the output current control circuit 124 and the high-voltage control circuit 126 respectively, so as to selectively control that merely the low-voltage control circuit 122 is activated, or the low-voltage control circuit 122 and the output current control circuit 124 are activated, or the low-voltage control circuit 122 and the high-voltage control circuit 126 are activated. In other words, the power converter 120 can be operated in one of the low voltage control mode, the low voltage and output current common control mode, and the low voltage and high voltage common control mode according to the control of the processing circuit 140, so as to correspondingly control according to the present system state.

In addition, as shown in FIG. 1, the high-voltage side and the low-voltage side of the power converter 120 may be coupled to the high-voltage side energy storage device 130 and the low-voltage side energy storage device 150 respectively to perform the necessary power compensation. In some embodiments, the high-voltage side energy storage device 130, the low-voltage side energy storage device 150 may be implemented by energy storage batteries. For example, the energy storage device 150 of the low-voltage side is electrically coupled to the low-voltage load device 170 and the low-voltage side of the power converting circuit 121. When the low-voltage load device 170 is under light load, the energy storage device 150 of the low-voltage side is able to receive additional power output by the power converter 120a. In this way, when the low-voltage load device 170 is under heavy load or the power converter 120 is unable to sufficiently supply the power required by the low-voltage load device 170, the energy storage device 150 of the low-voltage side is able to output the stored power to the low-voltage load device 170 to maintain the supply and demand balance on the power system.

Similarly, the energy storage device 130 of the high-voltage side is electrically coupled to the dc generator 110 and the high-voltage side of the power converting circuit 121. Accordingly, the energy storage device 130 of the high-voltage side may also adjust the power outputted from the dc generator 110 to the power converter 120, so as to maintain the stability of the HVDC voltage V1 on the high-voltage side.

However, if the high-voltage side energy storage device 130 is disconnected from the dc generator 110 or is in an abnormal state, the high-voltage side energy storage device 130 cannot adjust the HVDC voltage V1 on the high-voltage side. For example, in extremely low temperature environments. High voltage batteries may not work due to the low temperatures. Under this condition, if the loading terminal of the low-voltage side experiences changing conditions drastically, the response of the dc generator 110 is slow, and the output power of the generator is insufficiently adjusted in time. This could lead to the HVDC voltage V1 on the high-voltage side to experience overvoltage or under voltage, so that the protection circuit acts accordingly, and further causes the system to operate abnormally, such as the power system stops working.

In order to avoid the above situation, in some embodiments of the present disclosure, if the high-voltage side energy storage device 130 is disconnected from the dc generator 110 or is in an abnormal state, the processing circuit 140 is able to output the corresponding high-voltage command HVcmd to activate and control the high-voltage control circuit 126 to output the second control signal CT2 to the low-voltage control circuit 122 according to the high-voltage command HVcmd, so that the low-voltage control circuit 122 is able to generate the third control signal CT3 to control the HVDC voltage V1 to be regulated at a corresponding target voltage value.

Figure 3A:
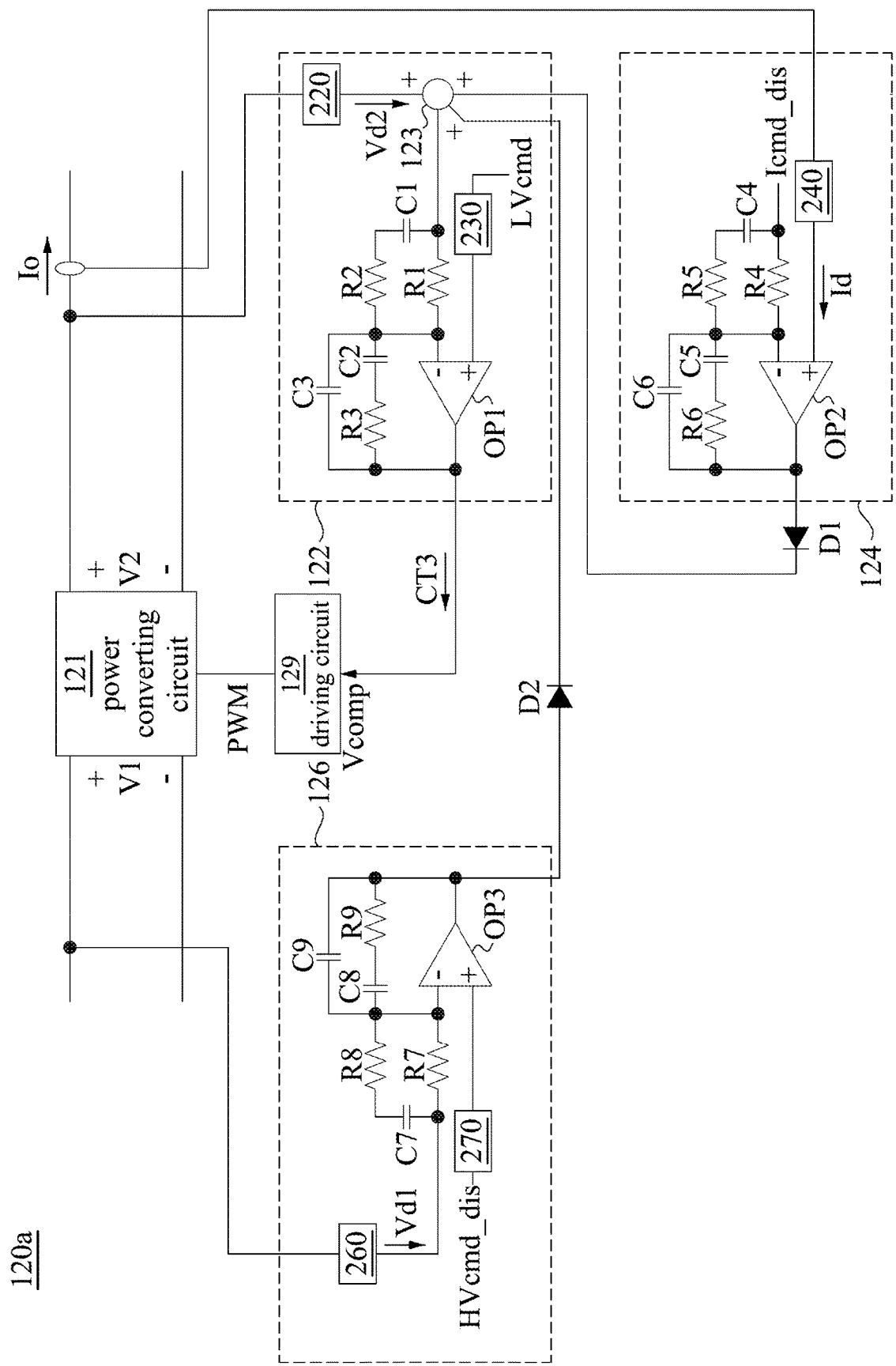
FIGS. 3A~3C are schematic diagrams illustrating operations of a power converter in accordance with some embodiments of the disclosure.
Figure 3B:
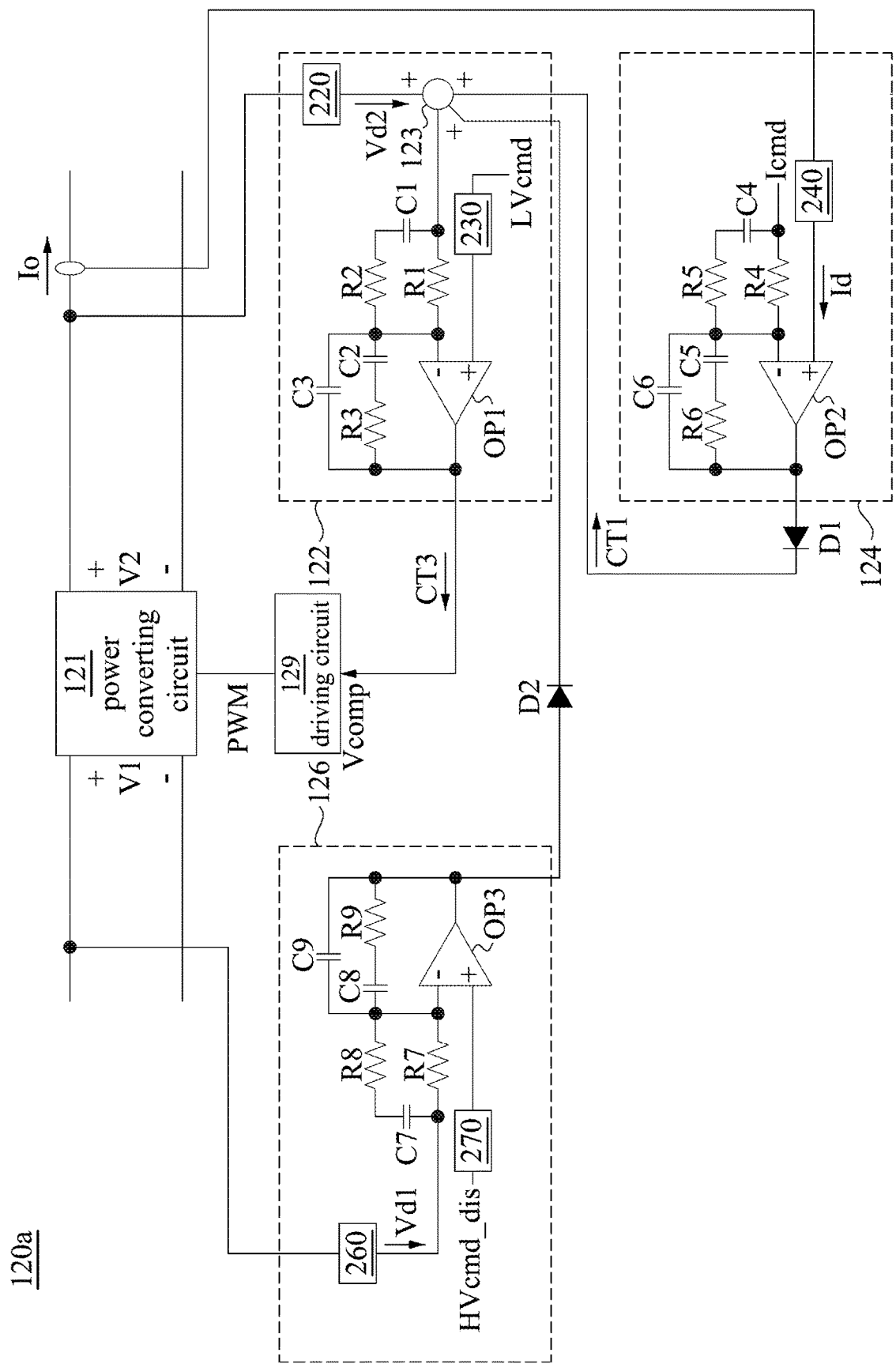
Figure 3C:
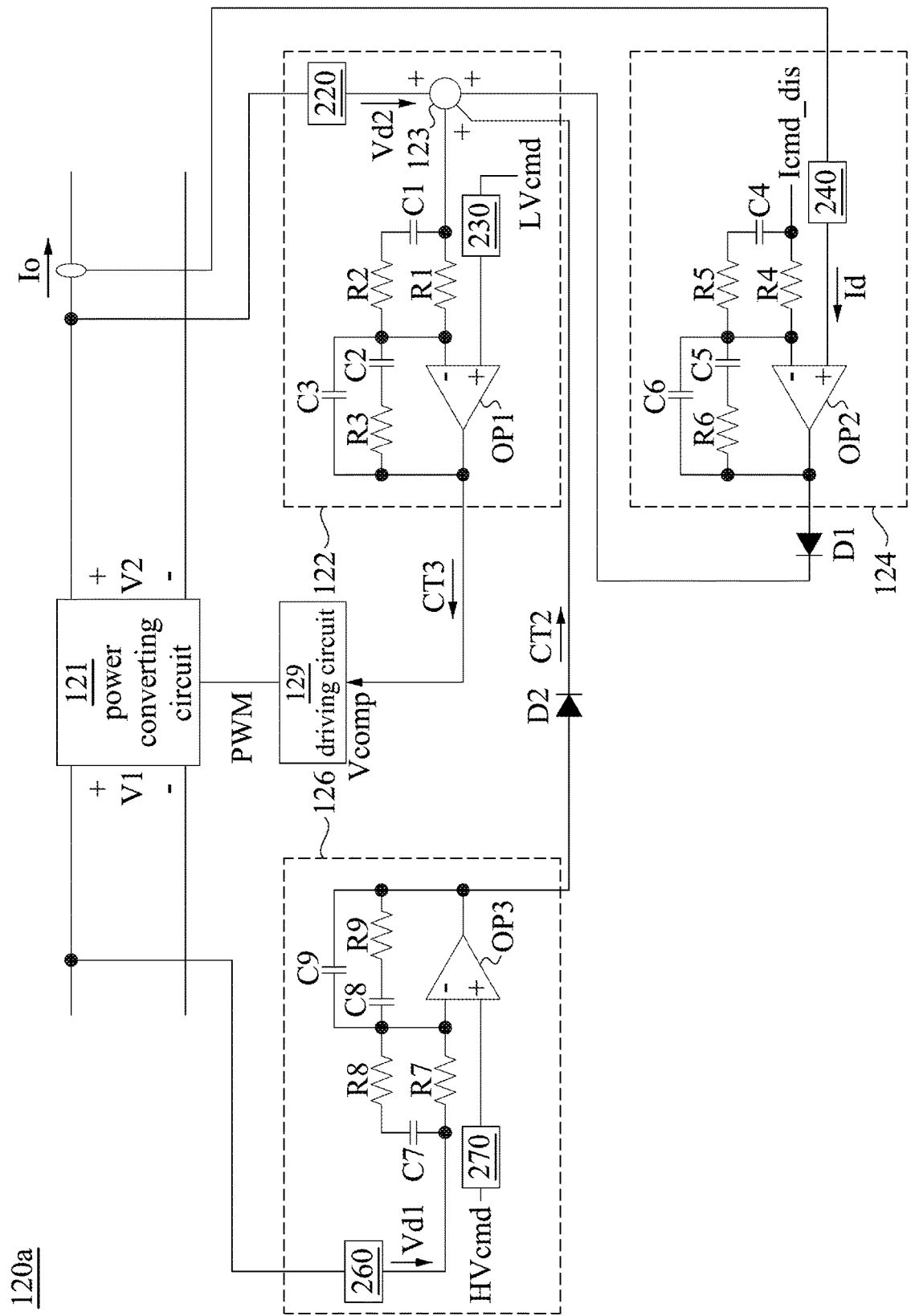

For convenience of explanation, the cooperative operation of the power converter 120 and the processing circuit 140 will be described with reference to FIGS. 3A~3C. Please refer to FIGS. 3A~3C. FIGS. 3A~3C are schematic diagrams illustrating operations of a power converter 120a in accordance with some embodiments of the disclosure. In some embodiments, the power converter 120a shown in FIGS. 3A~3C may be realized the power converter 120 shown in FIG. 1.

As shown in FIGS. 3A~3C, the low-voltage control circuit 122 includes a voltage detection circuit 220, a summing node 123, a compensation circuit and a comparison amplifier OP1. The voltage detection circuit 220 is electrically coupled to the low-voltage side, and configured to detect the LVDC voltage V2 to output a voltage detection signal Vd2 to summing node 123. For example, the voltage detection circuit 220 may be a voltage dividing circuit including voltage divider resisters connected in series with each other. By selecting the appropriate resistance of the voltage divider resisters, the voltage dividing circuit 220 is able to divide and output the voltage detection signal Vd2 with an appropriate voltage range for operation of the back-end circuit.

The summing node 123 is configured to combine the voltages present on two or more inputs into a single output voltage. The summing node 123 may be implemented by resistors connected to each input respectively.

The compensation circuit is electrically coupled between the summing node 123 and the driving circuit 129, and configured to receive the signal summed up by the summing node 123. In some embodiments, as shown in FIG. 3A, the compensation circuit may include resistors R1, R2, R3 and capacitors C1, C2, C3, but the present disclosure is not limited thereto. In some other embodiments, the compensation circuit may also include resistors and capacitors that are electrically connected in various forms to form an RC circuit. In the embodiments shown in FIGS. 3A~3C, the resistor R2 and the capacitor C1 are connected in series, a first terminal of the capacitor C1 and a first terminal of the resistors R1 are electrically coupled to the summing node 123, and a second terminal of the resistor R2 and a second terminal of the resistors R1 are electrically coupled to a second terminal (e.g., negative terminal) of a comparison amplifier OP1. The resistor R3 and the capacitor C2 are connected in series and then are connected to the capacitor C3 in parallel, one terminal of them is electrically coupled to the second terminal (e.g., negative terminal) of the comparison amplifier OP1, and the other terminal of them is electrically coupled to an output terminal of the comparison amplifier OP1.

A first terminal (e.g., positive terminal) of the comparison amplifier OP1 is electrically coupled to the processing circuit 140, and configured to receive the low-voltage command LVcmd. The second terminal (e.g., negative terminal) of the comparison amplifier OP1 is electrically coupled to the compensation circuit. The output terminal of the comparison amplifier OP1 is electrically coupled to the driving circuit 129, and configured to output the third control signal CT3 to the driving circuit 129.

It should be noted that, in some other embodiments, the low-voltage control circuit 122 may also receive the first control signal CT1 or the second control signal CT2 in other manners. Though in the embodiments of FIGS. 3A~3C, the output current control circuit 124 and the high-voltage control circuit 126 are both coupled to the summing node 123 in the low-voltage control circuit 122, but in some other embodiments, the power converter 120 may also be provided with a switch, and by using the switch, one or two of the LVDC voltage V2, the first control signal CT1 and the second control signal CT2 to the low-voltage control circuit 122 are selectively outputted. Therefore, the embodiments shown in FIGS. 3A~3C are merely possible implementation manners of the present disclosure, and are not intended to limit the present disclosure.

Similarly, as shown in FIGS. 3A~3C, in some embodiments, the output current control circuit 124 includes a current detection circuit 240, a compensation circuit, a comparison amplifier OP2 and a rectifying elements D1. The current detection circuit 240 is electrically coupled to the low-voltage side, and configured to output a current detection signal Id according to the output current Io. For example, in some embodiments, the current detection circuit 240 may be implemented by a current detecting resistor.

In some embodiments, the compensation circuit is electrically coupled between the processing circuit 140 and the low-voltage control circuit 122, and configured to receive the output current command Icmd or Icmd_dis. As shown in figure, similar to the low-voltage control circuit 122, the compensation circuit may include resistors R4, R5, R6 and the capacitors C4, C5, C6 to form an RC circuit. A first terminal (e.g., positive terminal) of the comparison amplifier OP2 is configured to receive the current detection signal Id, and a second terminal (e.g., negative terminal) of the comparison amplifier OP2 is electrically coupled to the compensation circuit. An output terminal of the comparison amplifier OP2 is electrically coupled to the low-voltage control circuit 122 through a rectifying element D1, and configured to output the first control signal CT1 to the low-voltage control circuit 122.

In some embodiments, the rectifying element D1 may be implemented by a diode unit. As shown in FIGS. 3A~3C, a positive terminal of the rectifying element D1 is coupled to the output terminal of the comparison amplifier OP2, and a negative terminal of the rectifying element D1 is coupled to the low-voltage control circuit 122. The rectifying element D1 is configured to ensure that the output current control circuit 124 and the low-voltage control circuit 122 do not interfere with each other because of having a current path.

Similarly, as shown in FIGS. 3A~3C, in some embodiments, the high-voltage control circuit 126 includes a voltage detection circuit 260, a compensation circuit, a comparison amplifier OP3 and a rectifying element D2. The voltage detection circuit 260 is electrically coupled to the high-voltage side, and configured to detect the HVDC voltage V1 to output a voltage detection signal Vd1. For example, similar to the voltage detection circuit 220, the voltage detection circuit 260 may also be a voltage dividing circuit including voltage divider resistors connected in series with each other.

In some embodiments, the compensation circuit is electrically coupled between the voltage detection circuit 260 and the low-voltage control circuit 122, and configured to receive the voltage detection signal Vd1. In some embodiments, as shown in figure, the compensation circuit may include resistors R7, R8, R9 and capacitors C7, C8, C9 to form an RC circuit.

A first terminal (e.g., positive terminal) of the comparison amplifier OP3 is electrically coupled to the processing circuit 140, and configured to receive the high-voltage command HVcmd or HVcmd_dis. A second terminal (e.g., negative terminal) of the comparison amplifier OP3 is electrically coupled to the compensation circuit. An output terminal of the comparison amplifier OP3 is electrically coupled to the low-voltage control circuit 122 through the rectifying element D2, and configured to output the second control signal CT2 to the low-voltage control circuit 122.

In some embodiments, similar to the rectifying element D1, the rectifying element D2 may be implemented by a diode unit. As shown in FIGS. 3A~3C, a positive terminal of the rectifying element D2 is coupled to the output terminal of the comparison amplifier OP3, and a negative terminal of the rectifying element D2 is coupled to the low-voltage control circuit 122. The rectifying element D2 is configured to ensure that the output current control circuit 124 and the high-voltage control circuit 126 do not interfere with each other because of having a current path.

In operation, as shown in FIG. 3A, when the energy storage device 130 of the high-voltage side is operating normally, the processing circuit 140 may control the power converter 120a to operate in the low voltage control mode or the low voltage and output current common control mode according to actual need. When the processing circuit 140 makes the power converter 120a operate in the low voltage control mode, the processing circuit 140 outputs the corresponding low-voltage command LVcmd. At this time, the low-voltage control circuit 122 receives the low-voltage command LVcmd from the processing circuit 140 to output the third control signal CT3 to the driving circuit 129 according to the low-voltage command LVcmd, so that the driving circuit 129 is able to control the LVDC voltage V2 to be regulated in the corresponding target voltage value.

Specifically, as shown in FIG. 3A, the low-voltage command LVcmd may be filtered by the RC filter circuit 230. The filtered low-voltage command LVcmd is inputted as the reference voltage of the low-voltage control circuit 122 to the positive terminal of the comparison amplifier OP1. And the voltage detection signal Vd2 outputted by the voltage detection circuit 220 is inputted to the negative terminal of the comparison amplifier OP1. In this way, the comparison amplifier OP1 is combined with the compensation circuit to output the third control signal CT3 to the driving circuit 129 according to the voltage error signal of the positive terminal and the negative terminal.

For example, in some embodiments, when the LVDC voltage V2 is increased, the voltage detection signal Vd2 is also increased accordingly. When the voltage level of the voltage detection signal Vd2 is higher than the low-voltage command LVcmd as the reference voltage, the voltage level of the third control signal CT3 is decreased. Since the output terminal of the comparison amplifier OP1 is electrically coupled to the Vcomp pin of the driving circuit 129, the voltage value of the Vcomp pin is correspondingly decreased, so that the duty cycle of the driving signal PWM outputted by the driving circuit 129 is decreased. As a result, the LVDC voltage V2 is decreased accordingly, so as to control the LVDC voltage V2 at a voltage level corresponding to the low-voltage command LVcmd.

Accordingly, the processing circuit 140 outputs a high-voltage command HVdis and the output current command Icmd_dis, so as to control the high-voltage control circuit 126 and the output current control circuit 124 to be deactivated. For example, the high-voltage command HVcmd_dis may be set to zero or a value close to zero at this time, and the output current command Icmd_dis may be set to a current command corresponding to the maximum output current. As a result, the high-voltage control circuit 126 and the output current control circuit 124 will not affect the third control signal CT3.

On the other hand, as shown in FIG. 3B, when the processing circuit 140 makes the power converter 120a operate in the low voltage and output current common control mode, the processing circuit 140 may slightly increase the low-voltage command LVcmd and output the corresponding output current command Icmd. The output current control circuit 124 may receive the output current command Icmd from the processing circuit 140, so as to output the first control signal CT1 to the low-voltage control circuit 122 according to the output current command Icmd, so that the low-voltage control circuit 122 is able to control the output current Io to be regulated in the corresponding target current value.

Specifically, as shown in FIG. 3B, the output current command Icmd is inputted as the reference current of the output current control circuit 124 to the negative terminal of the comparison amplifier OP2. The current detection signal Id outputted by the current detection circuit 240 is inputted to the positive terminal of the comparison amplifier OP2. In this way, the comparison amplifier OP2 is combined with the compensation circuit to output the first control signal CT1 to the low-voltage control circuit 122 according to the voltage error signal of the positive terminal and the negative terminal.

For example, in some embodiments, when the output current Io is increased, the current detection signal Id is also increased accordingly. When the current detection signal Id is higher than the output current command Icmd as the reference current, the voltage value of the first control signal CT1 is increased. Since the output terminal of the comparison amplifier OP2 is electrically coupled to the negative terminal of the comparison amplifier OP1, the voltage level of the third control signal CT3 is decreased. Therefore, when the voltage value of the first control signal CT1 increases, the voltage value of the Vcomp pin is correspondingly decreased, so that the output current Io is decreased.

In this way, the output current control circuit 124 is able to output the first control signal CT1 to the low-voltage control circuit 122 according to the output current command Icmd, so that the low-voltage control circuit 122 is able to control the output current Io to be regulated in the corresponding target current value corresponding to the output current command Icmd through the driving circuit 129. Correspondingly, at this time, the processing circuit 140 outputs the corresponding high-voltage command HVcmd_dis to control the high-voltage control circuit 126 to be deactivated. The specific operation details have been described in detail in the previous embodiments, and thus will not be described again.

On the other hand, in operation, as shown in FIG. 3C, if the energy storage device 130 of the high-voltage side is disconnected from the dc generator 110 or is in an abnormal state, the processing circuit 140 may slightly increase the low-voltage command LVcmd and output the corresponding high-voltage command HVcmd. At this time, the high-voltage control circuit 126 may receive the high-voltage command HVcmd from the processing circuit 140, so as to output the second control signal CT2 to the low-voltage control circuit 122 according to the high-voltage command HVcmd, so that the low-voltage control circuit 122 is able to control the HVDC voltage V1 to be regulated in the corresponding target voltage value through the driving circuit 129.

Specifically, as shown in FIG. 3C, the detailed operation of the high-voltage control circuit 126 is similar to the negative feedback control in the low-voltage control circuit 122. The high-voltage command HVcmd can be filtered through the RC filter circuit 270. The filtered high-voltage command HVcmd is inputted as a reference voltage of the high-voltage control circuit 126 to the positive terminal of the comparison amplifier OP3. The voltage detection signal Vd1 outputted by the voltage detection circuit 260 is inputted to the negative terminal of the comparison amplifier OP3. In this way, the comparison amplifier OP3 is able to output the second control signal CT2 to the low-voltage control circuit 122 according to the voltage error signal of the positive terminal and the negative terminal.

For example, in some embodiments, when the HVDC voltage V1 is decreased, the voltage detection signal Vd1 is also decreased accordingly. When the voltage detection signal Vd1 is smaller than the high-voltage command HVcmd as the reference voltage, the voltage value of the second control signal CT2 is increased. Since the output terminal of the comparison amplifier OP3 is electrically coupled to the negative terminal of the comparison amplifier OP1, the voltage level of the third control signal CT3 is decreased. Therefore, when the voltage value of the second control signal CT2 is increased (and the voltage detection signal Vd2 is maintained), the voltage value of the Vcomp pin is correspondingly decreased, so that the HVDC voltage V1 is increased.

In this way, the output power of the power converter 120a is reduced to control the HVDC voltage V1 without further reduction, causing the under voltage protection mechanism to start, thus the HVDC voltage V1 is able to be controlled to remain stable. Correspondingly, the processing circuit 140 outputs a corresponding output current command Icmd_dis to control the output current control circuit 124 to be deactivated.

In this way, the processing circuit 140 outputs one or two of the low-voltage command LVcmd, the output current command Icmd and the high-voltage command HVcmd, so that one or two of the low-voltage control circuit 122, the output current control circuit 124 and the high-voltage control circuit 126 may be controlled whether to be activated. Accordingly, if the high-voltage side energy storage device 130 is disconnected from the dc generator 110 or is in an abnormal state, the HVDC voltage V1 is able to be regulated in the corresponding target voltage value and to avoid being out of safe range and cause system misoperation. Also, if the high-voltage side of the energy storage device 130 is operating normally, the LVDC voltage V2 is able to control the voltage level corresponding to the low-voltage command LVcmd, and/or to stabilize the output current Io to be regulated in the corresponding target current value.

Figure 4A:
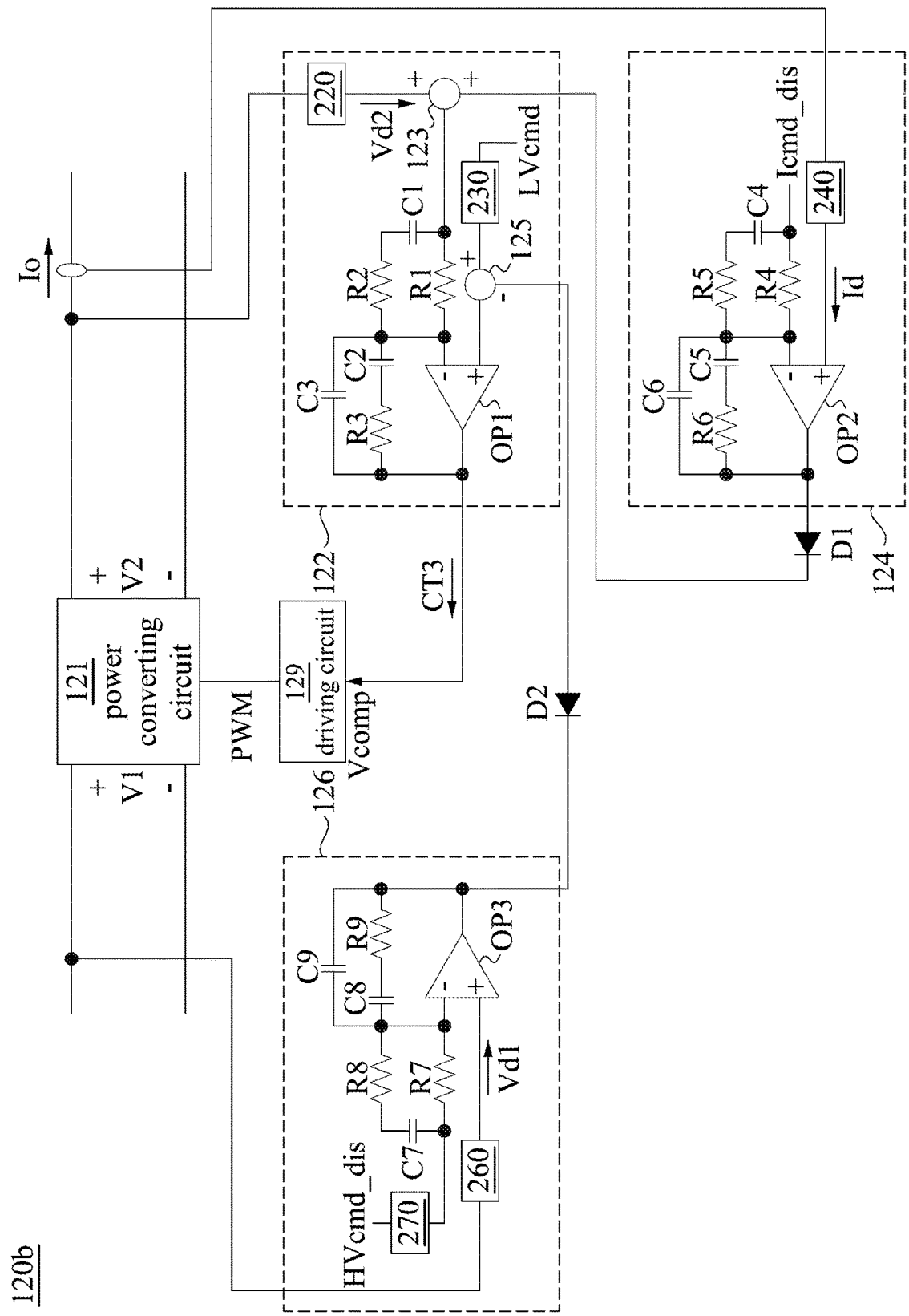
FIGS. 4A~4C are schematic diagrams illustrating operations of a power converter in accordance with some embodiments of the disclosure.
Figure 4B:
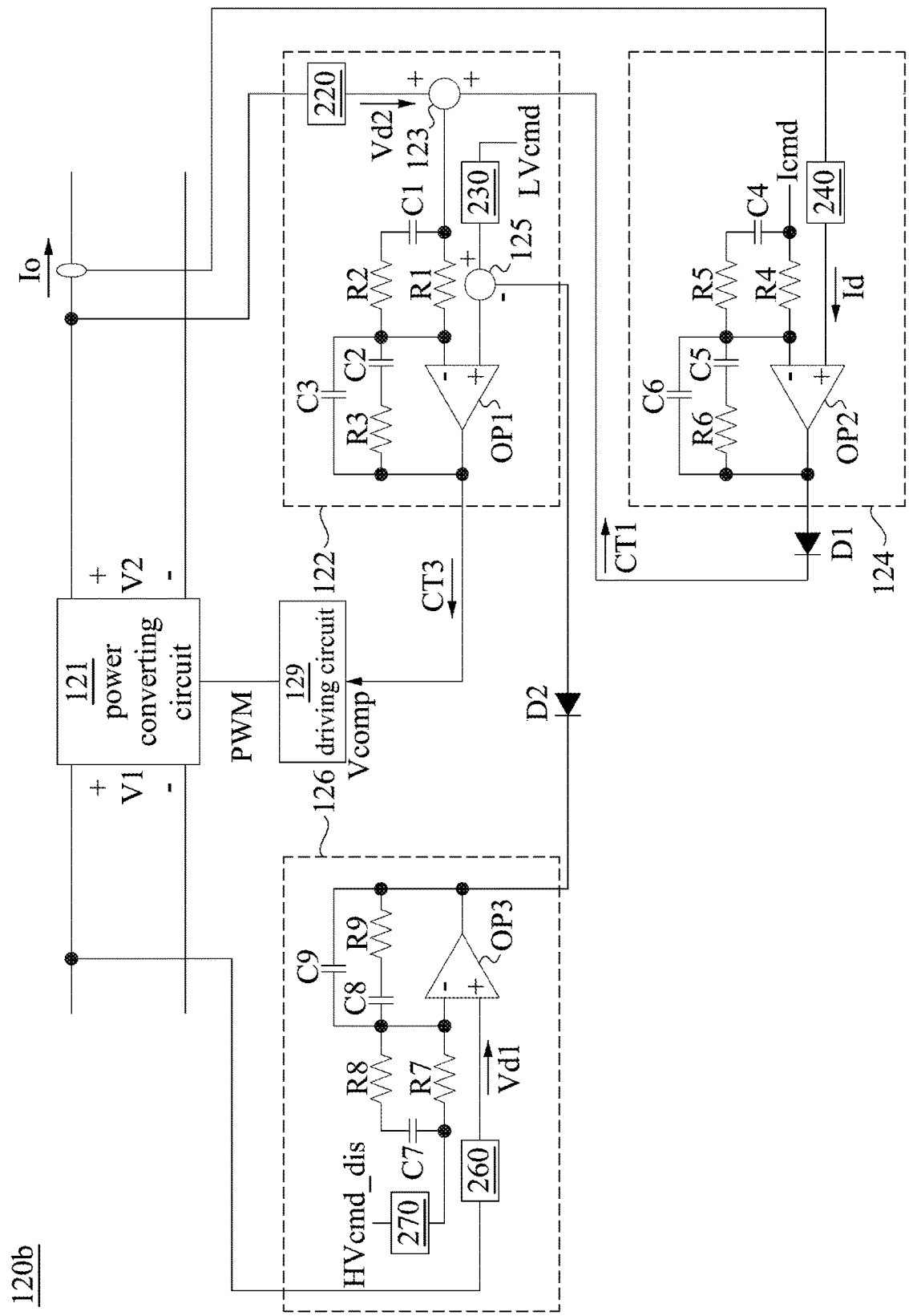
Figure 4C:
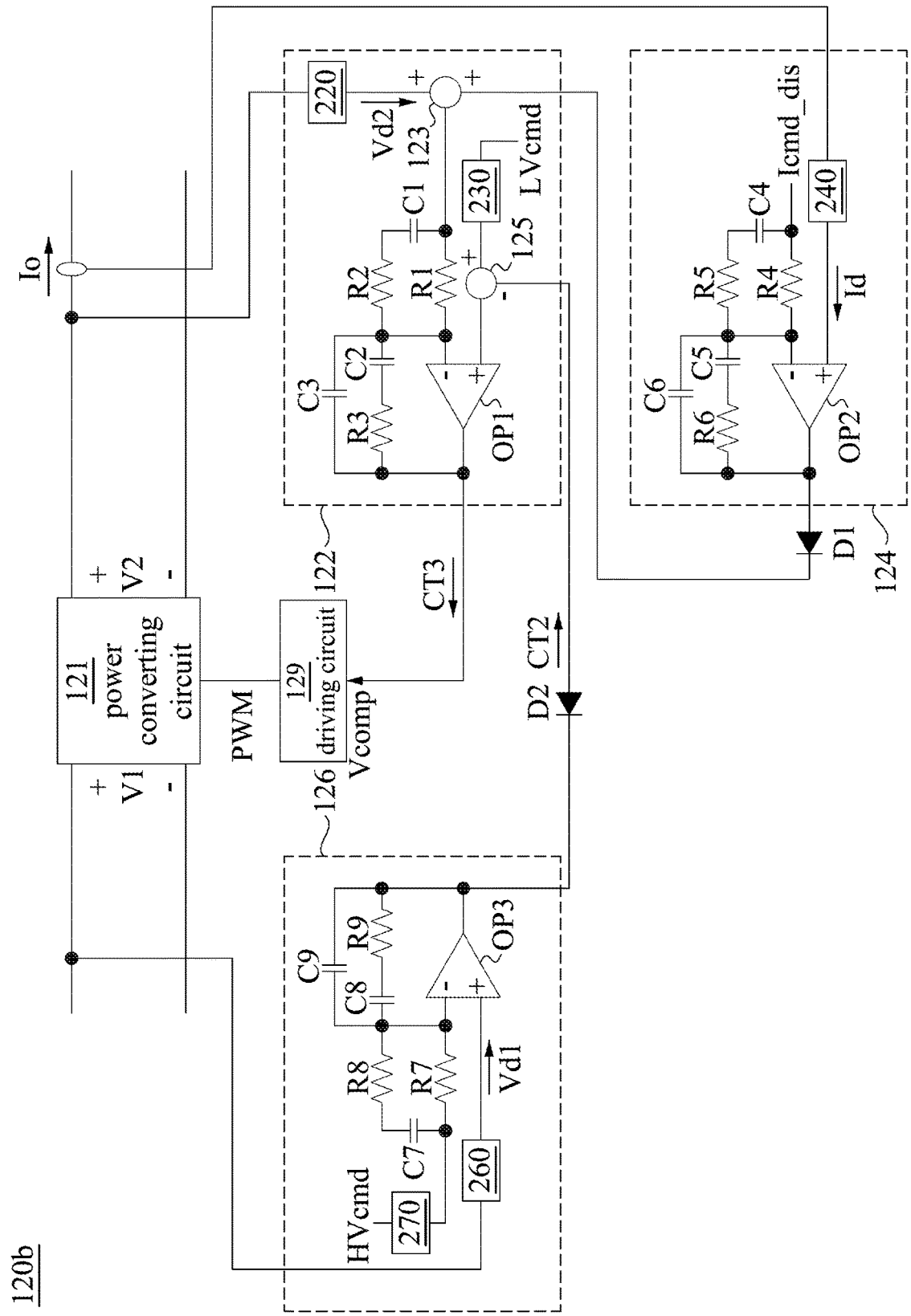

Please refer to FIGS. 4A~4C. FIGS. 4A~4C are schematic diagrams illustrating operations of a power converter 120b in accordance with some embodiments of the disclosure. In some embodiments, the power converter 120b shown in FIGS. 4A~4C may be realized the power converter 120 shown in FIG. 1. In FIGS. 4A~4C, the similar components associated with the embodiments of FIGS. 3A~3C are labeled with the same number for ease of understanding. The specific principle of the similar component has been explained in detail in the previous paragraphs, and unless it has a cooperative relationship with the components of FIGS. 3A~3C, it is not repeated here.

As compared to the embodiments of FIGS. 3A~3C, in the embodiments of FIGS. 4A~4C, the low-voltage control circuit 122 includes the summing node 123 and a subtraction node 125. The summing node 123 is electrically coupled to the voltage detection circuit 220 and the output current control circuit 124, and configured to receive the voltage detection signal Vd2 and the first control signal CT1, and to sum up the two and to output to the second terminal of the comparison amplifier OP1. The subtraction node 125 is electrically coupled to the processing circuit 140 and the high-voltage control circuit 126, and configured to reduce the low-voltage command LVcmd through the second control signal CT2. The subtraction node 125 may be implemented by resistors connected to each input respectively.

In addition, in the embodiments of FIGS. 4A~4C, the first terminal of the high-voltage control circuit 126 is electrically coupled to the voltage detection circuit 260, and configured to receive the voltage detection signal Vd1. The second terminal of the comparison amplifier OP3 of the high-voltage control circuit 126 is electrically coupled to the processing circuit 140 through the compensation circuit and the RC filter circuit 270, and configured to receive the filtered high-voltage command HVcmd or HVcmd_dis.

In operation, when the processing circuit 140 makes the power converter 120b selectively operated in the low-voltage control mode, as shown in FIG. 4A, similar to FIG. 3A, the processing circuit 140 outputs the corresponding low-voltage command LVcmd. At this time, the low-voltage control circuit 122 may receive the low-voltage command LVcmd from the processing circuit 140 through the subtraction node 125, and receive the voltage detection signal Vd2 from the voltage detection circuit 220 through the summing node 123, so that the comparison amplifier OP1 is combined with the compensation circuit to output the third control signal CT3 to the driving circuit 129 according to the voltage error signal of the positive terminal and the negative terminal. Correspondingly, the processing circuit 140 outputs the corresponding high-voltage command HVcmd_dis and the output current command Icmd_dis to control the high-voltage control circuit 126 and the output current control circuit 124 to be deactivated.

On the other hand, when the processing circuit 140 makes the power converter 120b selectively operated in the low voltage and output current common control mode, as shown in FIG. 4B, similar to FIG. 3B, the processing circuit 140 may slightly increase the low-voltage command LVcmd and output the corresponding output current command Icmd. At this time, the low-voltage control circuit 122 may receive the low-voltage command LVcmd through the subtraction node 125, and receive the sum of the voltage detection signal Vd2 and the first control signal CT1 through the summing node 123, so that the comparison amplifier OP1 is combined with the compensation circuit to output the third control signal CT3 to the driving circuit 129 according to the voltage error signal of the positive terminal and the negative terminal.

Correspondingly, the processing circuit 140 outputs a corresponding high-voltage command HVcmd_dis to control the high-voltage control circuit 126 to be deactivated.

On the other hand, when the processing circuit 140 makes the power converter 120b selectively operated in the low voltage and high voltage common control mode, as shown in FIG. 4C, the processing circuit 140 outputs a corresponding high-voltage command HVcmd and slightly increases the low-voltage command LVcmd. At this time, the low-voltage control circuit 122 may receive the difference between the low-voltage command LVcmd and the second control signal CT2 through the subtraction node 125, and receive the voltage detection signal Vd2 through the summing node 123, so that the comparison amplifier OP1 is combined with the compensation circuit to output the third control signal CT3 to the driving circuit 129 according to the voltage error signal of the positive terminal and the negative terminal. Correspondingly, the processing circuit 140 outputs the corresponding output current command Icmd_dis to control the output current control circuit 124 to be deactivated.

For example, in some embodiments, when the HVDC voltage V1 is decreased, the voltage detection signal Vd1 is also decreased accordingly. When the voltage detection signal Vd1 is smaller than the high-voltage command HVcmd as the reference voltage, the voltage value of the second control signal CT2 is decreased. Since the output terminal of the comparison amplifier OP3 is electrically coupled to the subtraction node 125 through a reversed diode D2, the low-voltage command LVcmd is reduced through the decreased second control signal CT2. Therefore, the voltage value of the Vcomp pin is correspondingly decreased, so that the duty cycle of the driving signal PWM output by the driving circuit 129 is decreased.

in this way, as described in the previous embodiments of FIGS. 3A~3C, in the embodiments shown in FIGS. 4A~4C, when the energy storage device 130 of the high-voltage side is disconnected from the dc generator 110 or is in an abnormal state, the power converter 120b is able to operate in the low voltage and high voltage common control mode. On the other hand, when the energy storage device 130 of the high-voltage side is operating normally, the processing circuit 140 is able to control the power converter 120b to operate in the low-voltage control mode or the low-voltage and output current common control mode according to actual needs. The processing circuit 140 is configured to output the corresponding low-voltage command, the output current command, and the high-voltage command to control the low-voltage control circuit 122, the output current control circuit 124, and the high-voltage control circuit 126 to be activated or decoupled respectively, so as to stabilize the LVDC voltage V2, the output current Io or the HVDC voltage V1 at the corresponding target voltage value and target current value.

Figure 5:
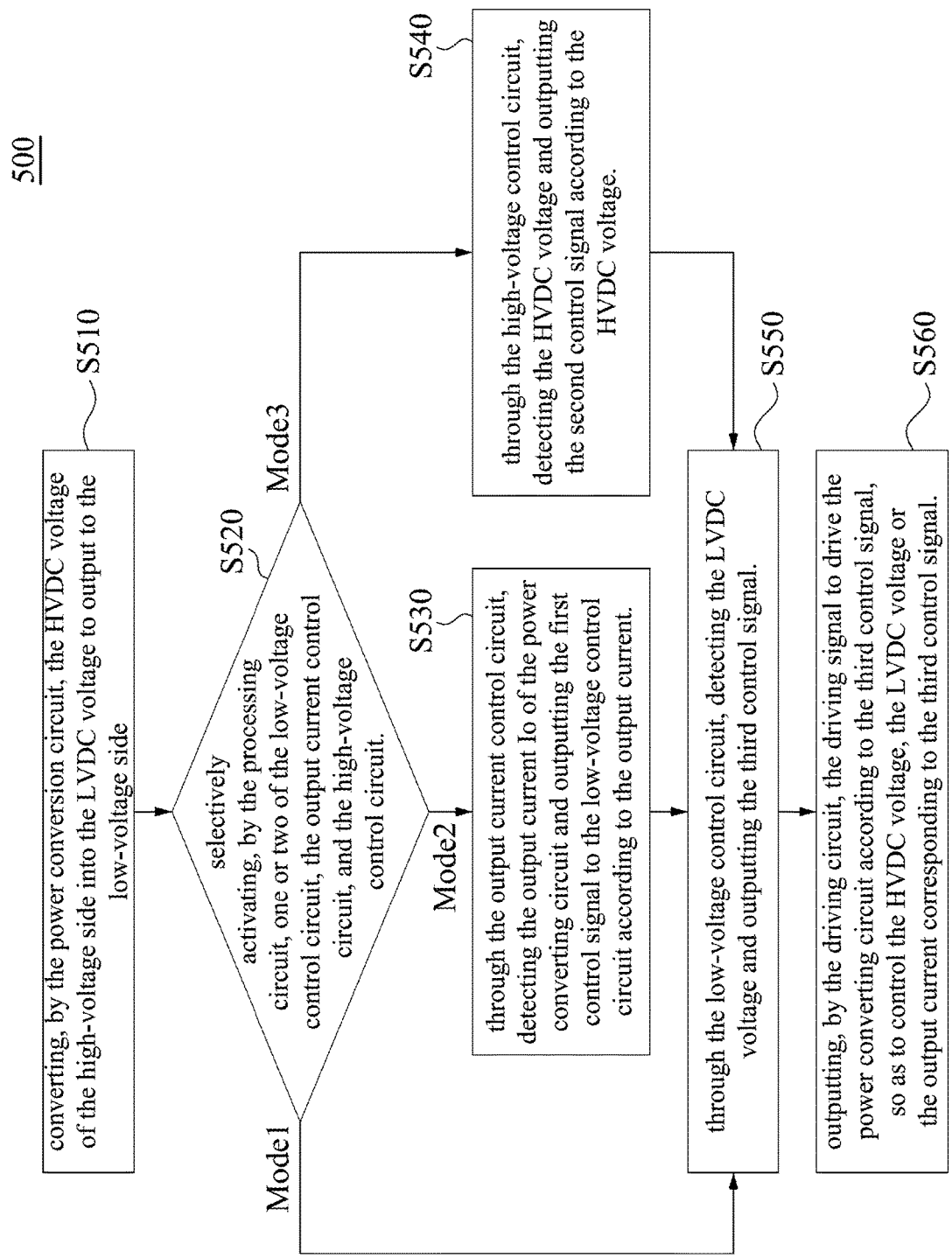
FIG. 5 is a flow chart illustrating a power converter control method in accordance with some embodiments of the disclosure.

Please refer to FIG. 5. FIG. 5 is a flow chart illustrating a power converter control method 500 in accordance with some embodiments of the disclosure. For convenience and clarity of description, the following control method 500 of the power converter 120 is described with reference to the embodiments shown in FIGS. 1~40, but not meant to limit thereto. Various alterations and modifications may be performed on the disclosure by those of ordinary skilled in the art without departing from the principle and spirit of the disclosure. As shown in FIG. 5, the control method 500 of the power converter 120 includes operations S510, S520, S530, S540, S550, and S560.

First, in operation S510, converting, by the power conversion circuit 121, the HVDC voltage V1 of the high-voltage side into the LVDC voltage V2, and outputting the LVDC voltage V2 to the low-voltage side.

In operation S520, selectively activating, by the processing circuit 140, one or two of the low-voltage control circuit 122, the output current control circuit 124, and the high-voltage control circuit 126. Specifically, the processing circuit 140 is able to selectively operate the power converter 120 in one of the low voltage control mode Mode1, the low voltage and the output current common control mode Mode2, and the low voltage and high voltage common control mode Mode3.

In the low voltage and the output current common control mode Mode2, operation S530 is executed. In operation S530, when the output current control circuit 124 is activated, through the output current control circuit 124, detecting the output current Io of the power converting circuit 121 and outputting the first control signal CT1 to the low-voltage control circuit 122 according to the output current Io. For example, the output current control circuit 124 is able to output the first control signal CT1 to the low-voltage control circuit 122 according to the detected current detection signal Id and output current command Icmd.

In the low voltage and high voltage common control mode Mode3, operation S540 is executed. In operation S540, when the high-voltage control circuit 126 is activated, through the high-voltage control circuit 126, detecting the HVDC voltage V1 and outputting the second control signal CT2 according to the HVDC voltage V1. For example, the high-voltage control circuit 126 is able to output the second control signal CT2 to the low-voltage control circuit 122 according to the detected voltage detection signal Vd1 and high-voltage command HVcmd.

After operation S530 or S540, or in the low-voltage control mode Mode1, operation S550 is executed. In operation S550, when the low-voltage control circuit 122 is activated, through the low-voltage control circuit 122, detecting the LVDC voltage V2 and outputting the third control signal CT3 correspondingly. For example, in the low-voltage control mode Mode1, the low-voltage control circuit 122 is able to output the third control signal CT3 to the driving circuit 129 according to the detected voltage detection signal Vd2 and low-voltage command LVcmd. For another example, in the low-voltage and output current common control mode Mode2, the low-voltage control circuit 122 is able to output the third control signal CT3 to the driving circuit 129 according to the voltage detection signal Vd2, the low-voltage command LVcmd and the first control signal CT1. For another example, in the low-voltage and the high-voltage common control mode Mode3, the low-voltage control circuit 122 is able to output the third control signal CT3 to the driving circuit 129 according to the voltage detection signal Vd2, the low-voltage command LVcmd and the second control signal CT2. The specific content is explained in detail in the previous paragraph, and thus will not be described again.

Finally, in operation S560, outputting, by the driving circuit 129, the driving signal to drive the power converting circuit 121 according to the third control signal CT3, so as to control the HVDC voltage V1, the LVDC voltage V2 or the output current Io corresponding to the third control signal CT3.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

People of ordinary skill in the art can directly understood how this control method 500 is based on the power converting system 100 of the various different embodiments described above to perform such operations and functions, and thus will not be described again.

In the foregoing, exemplary steps are included. However, these steps do not need to be performed sequentially. The steps mentioned in the embodiment may be adjusted according to actual needs unless the order is specifically stated, and may even be performed simultaneously or partially simultaneously.

Figure 6:
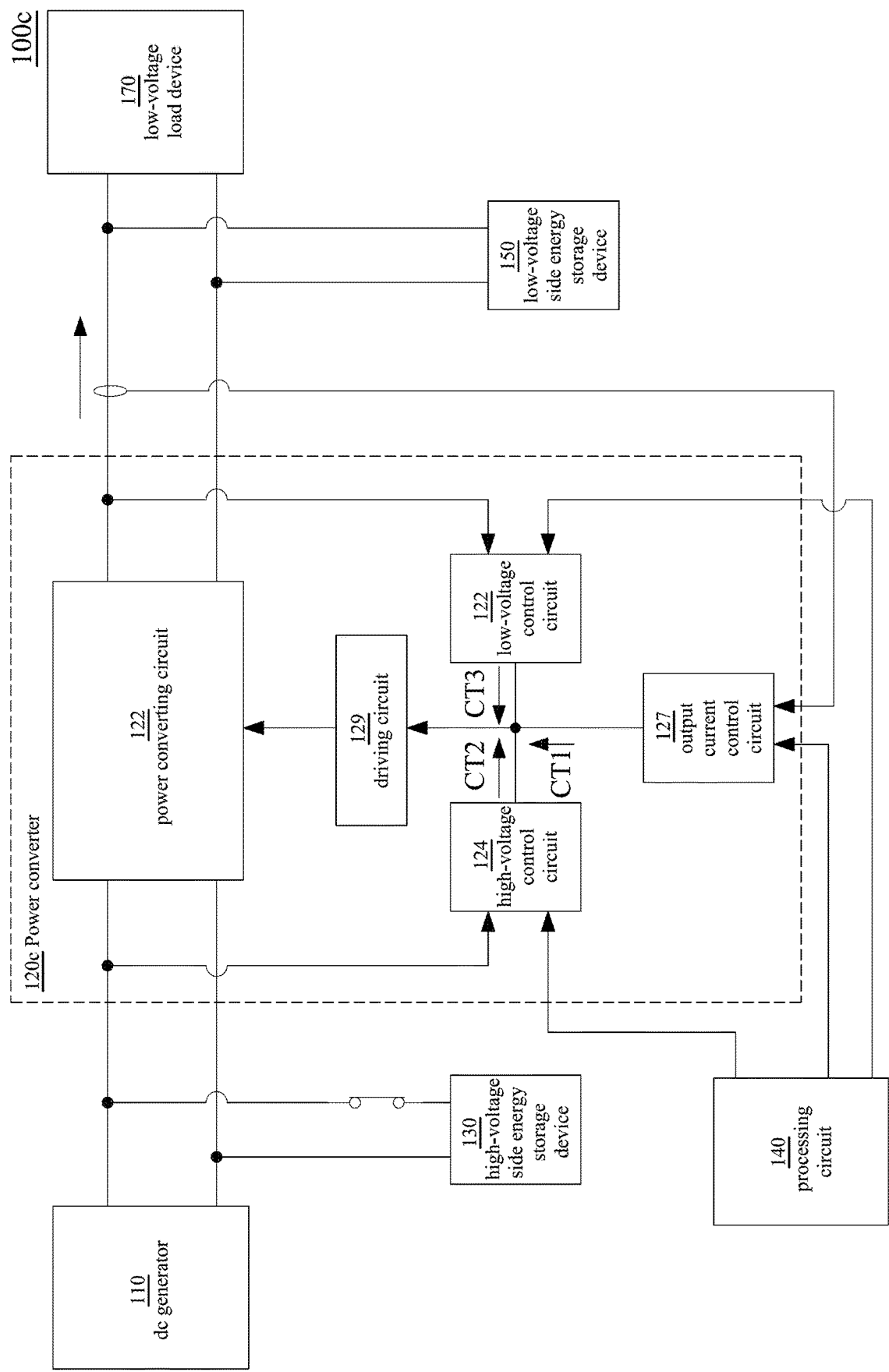
FIG. 6 is a schematic diagram of a power converting system according to an embodiment of the present disclosure.

Please refer to the FIG. 6. In FIG. 6, the similar components associated with the embodiment of FIG. 1 are labeled with the same number for ease of understanding. The specific principle of the similar component has been explained in detail in the previous paragraphs, and unless it has a cooperative relationship with the components of FIG. 6, it is not repeated here.

As shown in FIG. 6, compared to the embodiment of FIG. 1, in some embodiments, the power converter 120c also includes the low-voltage control circuit 122, the output current control circuit 124 and the high-voltage control circuit 126, but the output current control circuit 124 and the high-voltage control circuit 126 are electrically coupled to the driving circuit 129. The driving circuit 129 is further configured to selectively output the driving signal PWM according to the first control signal CT1, the second control signal CT2, or the third control signal CT3.

Specifically, in this embodiment, the power converter 120 is able to operate in any of the high voltage control mode, the low voltage control mode, or the output current control mode according to the control of the processing circuit 140 to perform corresponding control according to the current system state.

As described in the previous embodiment, if the high-voltage side energy storage device 130 is decoupled from the dc generator 110 or is in an abnormal state, the power converter 120 is operable in a high voltage control mode. On the other hand, when the high-voltage side energy storage device 130 is operating normally, the processing circuit 140 is able to control the power converter 120 to operate in the low voltage control mode or the output current control mode according to actual needs.

Figure 7A:
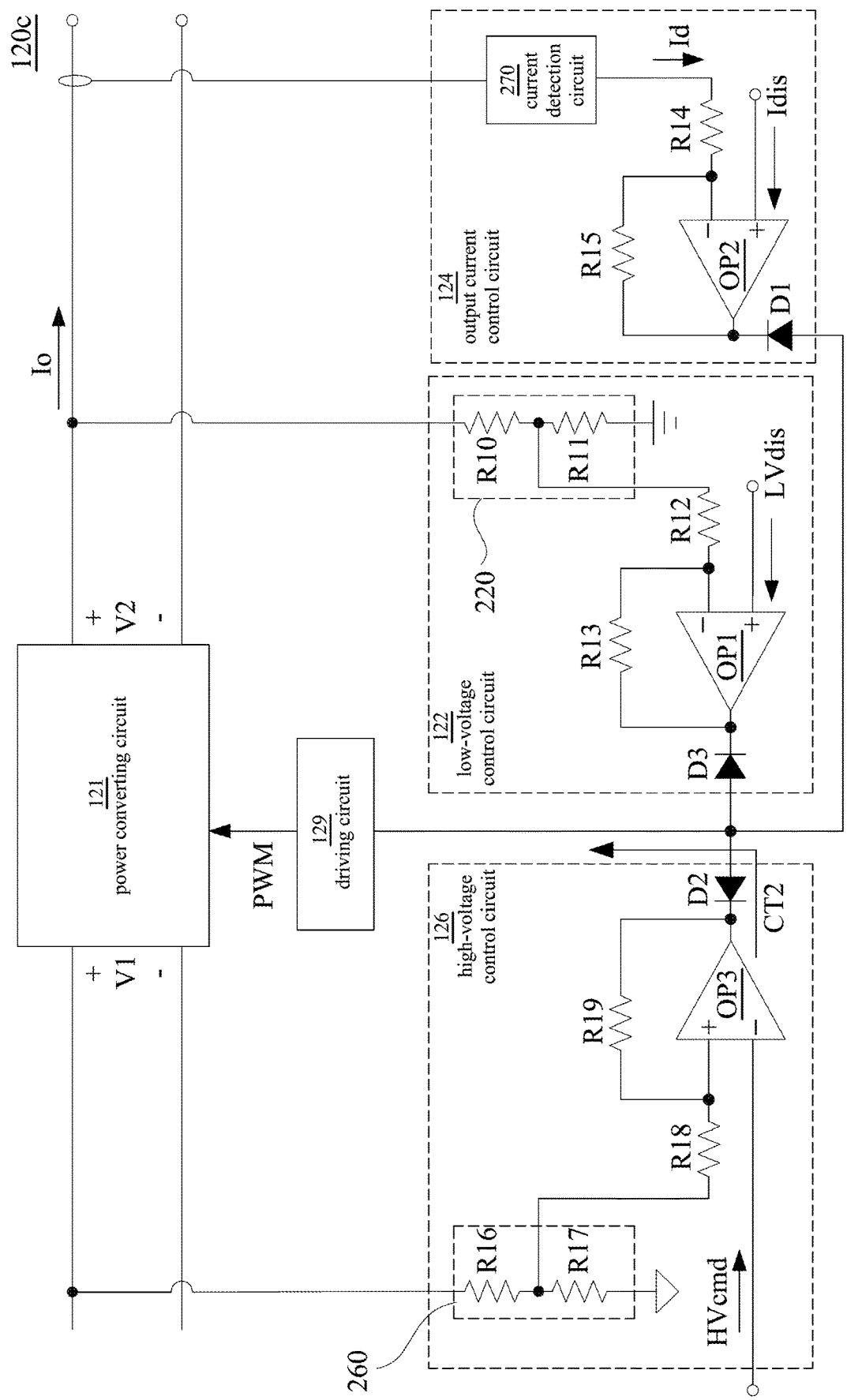
FIGS. 7A~7C are operation schematic diagrams of a power converter according to embodiments of the present disclosure.
Figure 7B:
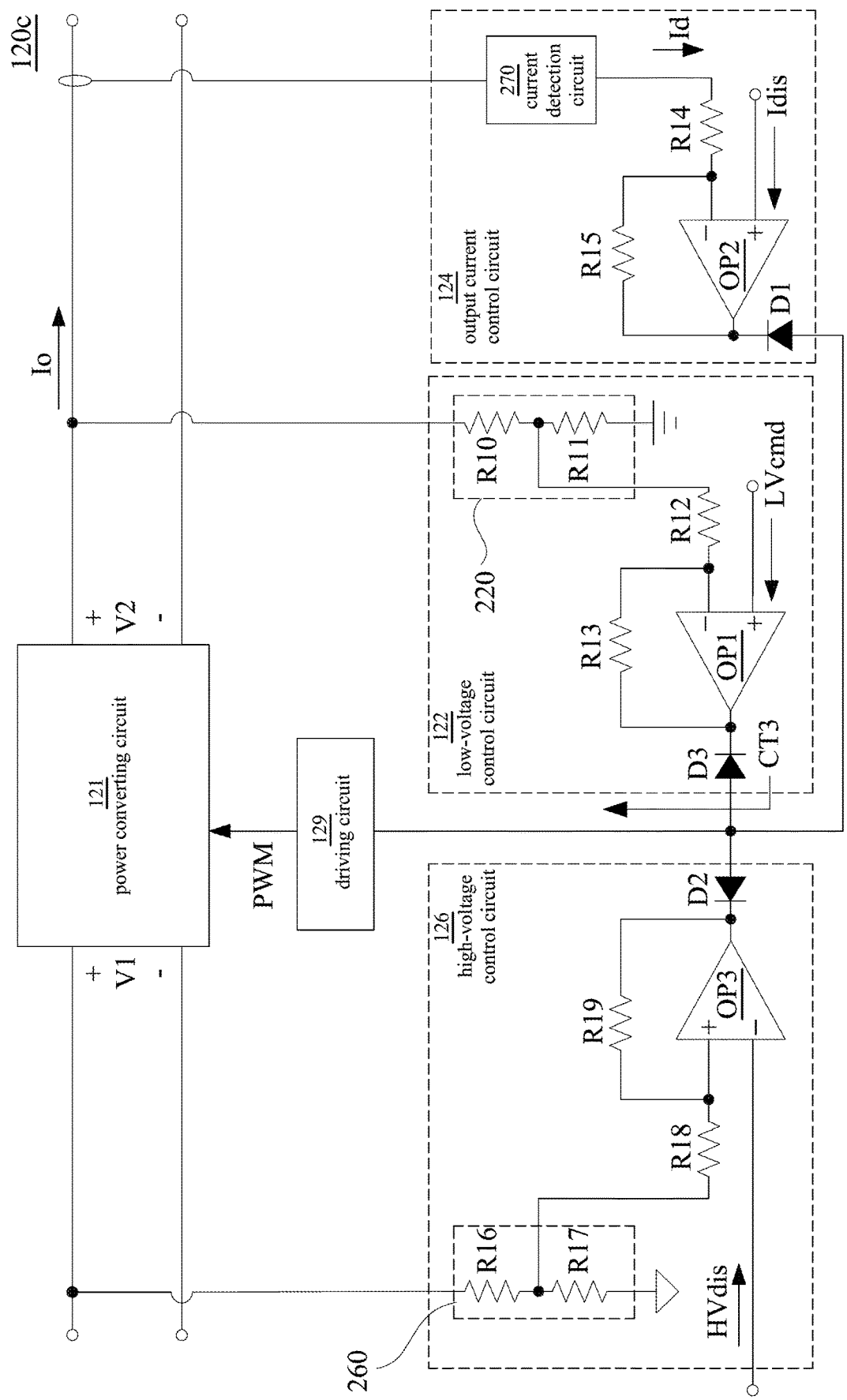
Figure 7C:
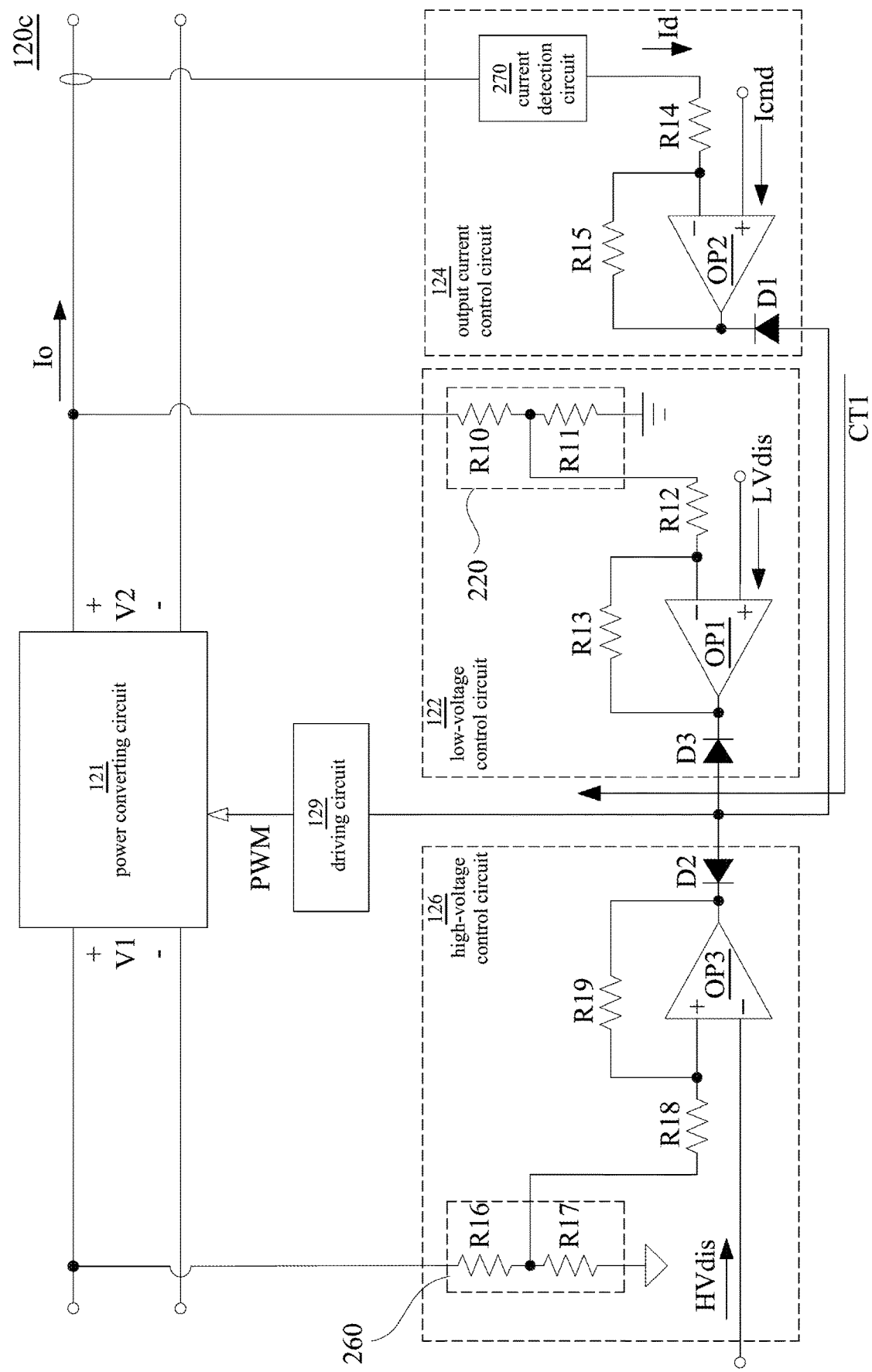

For convenience of explanation, the cooperative operation of the power converter 120 and the processing circuit 140 will be described with reference to FIGS. 7A~7C. Referring to FIGS. 7A~7C, the similar components associated with the embodiments of FIGS. 3A~3C are labeled with the same number for ease of understanding. The specific principle of the similar component has been explained in detail in the previous paragraphs, and unless it has a cooperative relationship with the components of FIGS. 7A~7C, it will not be repeated here.

As shown in FIG. 7A, if the energy storage device 130 of the high-voltage side is decoupled from the dc generator 110 or is in an abnormal state, the power converter 120 may operate in the high voltage control mode. At this time, the processing circuit 140 outputs a high-voltage command HVcmd, so that the comparison amplifier OP3 can be combined with the compensation circuit to output the control signals CT2 to the driving circuit 129 according to the voltage error signals of the positive end and the negative end.

Correspondingly, the processing circuit 140 outputs a corresponding low-voltage command LVdis and an output current command Idis to control the low-voltage control circuit 122 and the output current control circuit 124 to be deactivated. For example, the output current command Idis is similar to the low-voltage command LVdis and can be set to a current command corresponding to the maximum output current. As a result, the circuits in the low-voltage control circuit 122 and the output current control circuit 124 do not operate to affect the voltage value of the connection Vcomp. Since this specific operation details have been described in detail in the previous embodiments, it will not be described again.

As shown in FIG. 7B, when the high-voltage side energy storage device 130 is operating normally, the power converter 120 is selectively operable in the low voltage control mode. At this time, the processing circuit 140 outputs a low-voltage command LVcmd, so that the comparison amplifier OP1 can be combined with the compensation circuit to output the control signal CT3 to the driving circuit 129, according to the voltage error signals of the positive end and the negative end.

Correspondingly, the processing circuit 140 outputs a corresponding high-voltage command HVdis and an output current command Idis to control the high-voltage control circuit 126 and the output current control circuit 124 to be deactivated. Since this specific operation details are described in detail in the previous embodiments, it is not further described again.

As shown in FIG. 7C, the power converter 120 can also selectively operate in the output current control mode when the high-voltage side energy storage device 130 is operating normally. At this time, the processing circuit 140 outputs an output current command Icmd, so that the comparison amplifier OP2 can be combined with the compensation circuit to output the control signal CT1 to the driving circuit 129 according to the voltage error signals of the positive end and the negative end.

Therefore, when the output current control circuit 124 is activated, the output current control circuit 124 can output the first control signal CT1 to the driving circuit 129 according to the output current command Icmd, so that the driving circuit 129 controls the output current Io to be regulated at a target current value corresponding to the output current command Icmd. Since the detailed operation of the output current control circuit 124 is substantially similar to the negative feedback control in the low-voltage control circuit 122, the details thereof will not be further described again.

Correspondingly, the processing circuit 140 outputs the corresponding high-voltage command HVdis and low-voltage command LVdis to control the high-voltage control circuit 126 and the low-voltage control circuit 122 to be deactivated. Since this specific operation details have been described in detail in the previous embodiments, it will not be further described again.

As a result, in the embodiment shown in FIG. 6 and FIGS. 7A~7C, if the high-voltage side energy storage device 130 is decoupled from the dc generator 110 or is in an abnormal state, the processing circuit 140 is configured to output the corresponding high-voltage command, the corresponding low-voltage command and the corresponding output current command to control the high-voltage control circuit 126 to be activated, and the low-voltage control circuit 122 and the output current control circuit 124 are deactivated to stabilize the HVDC voltage V1 towards the corresponding target voltage value.

When the high-voltage side energy storage device 130 is operating normally, the processing circuit 140 is configured to output a corresponding high-voltage command, a low-voltage command, and an output current command to control for the low-voltage control circuit 122 or the output current control circuit 124 to be activated so as to stabilize the LVDC voltage V2 at the corresponding target voltage value, or to stabilize the output current Io at the corresponding target current value.

In addition, in some implementations, when the high-voltage control circuit 126 is activated, if the voltage detection signal Vd1 is smaller than the high-voltage command HVcmd as the reference voltage, the duty cycle of the driving signal PWM outputted by the driving circuit 129 is decreased. At this time, if the output power of the power converter 120 is decreased, and the LVDC voltage V2 outputted to the low-voltage side is smaller than the energy storage device 150 of the low-voltage side, the current of the low-voltage side may be reversed back to the power converting circuit 121, causing the power converting circuit 121 to be damaged.

Figure 8A:
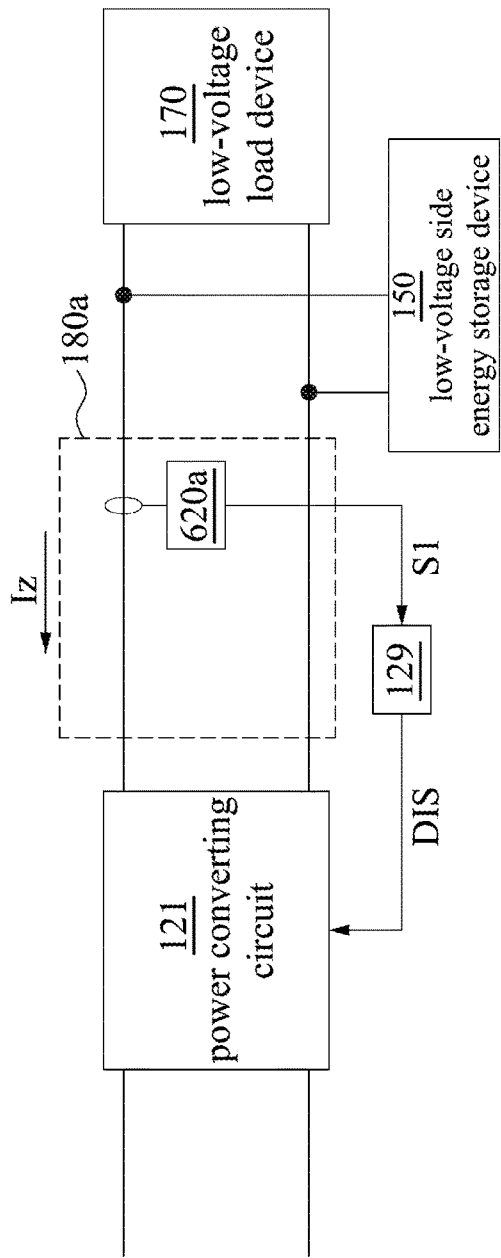
FIGS. 8A~8B are schematic diagrams illustrating operations of a protection circuit in accordance with some embodiments of the disclosure.
Figure 8B:
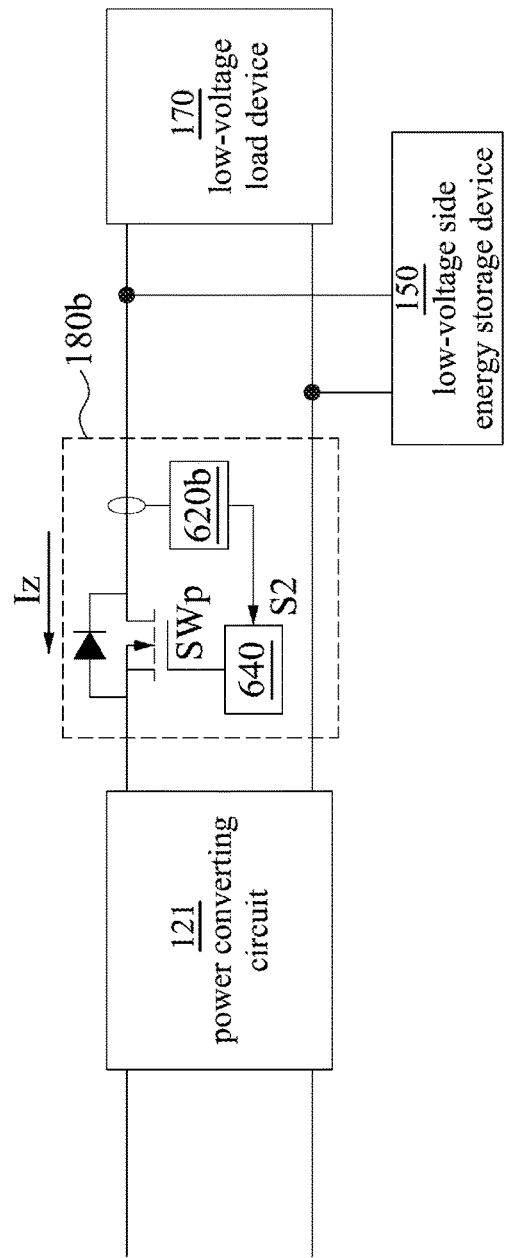

In order to avoid the above situation, in some embodiments of the present disclosure, as shown in FIG. 1, the protection circuit 180 is electrically coupled between the power converting circuit 121 and the low-voltage side energy storage device 150. For the sake of explanation, please refer to FIGS. 8A~8B for the operation of protection circuit 180. FIGS. 8A~8B are schematic diagrams illustrating operations of protection circuits 180a and 180b in accordance with some embodiments of the disclosure. The protection circuits 180a, 180b shown in FIGS. 8A~8B may be used to implement the protection circuit 180 in FIG. 1. As shown in FIGS. 8A~8B, the protection circuits 180a and 180b are coupled to the low-voltage side, when the reverse current Iz flowing from the low-voltage side to the power converting circuit 121 is detected, the protection circuits 180a and 180b are configured to output a stop command DIS to protect the power conversion circuit 121.

In some embodiments, as shown in FIG. 8A, the protection circuit 180a includes a reverse current detection circuit 620a. The reverse current detection circuit 620a is electrically coupled between the low-voltage side and the power converting circuit 121. When the reverse current Iz is detected by the reverse current detection circuit 620a, the reverse current detection circuit 620a is configured to output the detection signal S1 to the driving circuit 129. When the driving circuit 129 receives the detection signal S1, the driving circuit 129 is configured to output the stop command DIS to turn off the plurality of switches in the power converting circuit 121 (such as the switches SW1 to SW4 shown in FIG. 2).

In some other embodiments, as shown in FIG. 8B, the protection circuit 180b includes a reverse current detection circuit 620b, a protection switch SWp, and a protection switch driver 640. The reverse current detection circuit 620b is electrically coupled between the low-voltage side and the protection switch driver 640. When the reverse current detection circuit 620b detects the reverse current Iz, the reverse current detection circuit 620b is configured to output the detection signal S2 to the protection switch driver 640. When the protection switch driver 640 receives the detection signal S2, the protection switch driver 640 is configured to output the stop command to turn off the protection switch SWp.

In this way, by the reverse current detection circuit 620a and/or 620b, when the reverse current Iz occurs, the switches of the power converting circuit 121 and/or the protection switch SWp on the path of the output current are be able to be actively and quickly turned off through the detection signal S1 and/or S2, to prevent the power converting circuit 121 from being damaged.

Furthermore, each of the above embodiments may be implemented by various types of digital or analog circuits or by different integrated circuit chips. Individual components may also be integrated into a single control chip. Various control circuits may also be implemented by various processors or other integrated circuit chips. The above is only an example, and it should not limit the present disclosure.

In summary, in the above embodiments, when the high-voltage side energy storage device 130 is disconnected from the dc generator 110 or an abnormality occurs, the corresponding high-voltage command HVcmd is output through the processing circuit 140. The high-voltage control circuit 126 outputs the second control signal CT2 to the low-voltage control circuit 122 according to the high-voltage command HVcmd, so that the low-voltage control circuit 122 controls the HVDC voltage V1 to stabilize at the corresponding target voltage value through the driving circuit 129, so as to avoid voltage abnormality protection mechanism to start. In this way, under the condition that the high-voltage battery abnormally fails, the power converter 120 can actively stabilize the high-voltage power supply to ensure that the vehicle can run normally, thereby improving the system reliability.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A power converter, comprising:
    a power converting circuit, configured to receive a High Voltage Direct Current voltage from a high-voltage side, to convert the High Voltage Direct Current voltage to a Low Voltage Direct Current voltage and to output the Low Voltage Direct Current voltage to a low-voltage side;
    an output current control circuit, electrically coupled to the low-voltage side, configured to detect an output current of the power converting circuit and to output a first control signal according to the output current;
    a high-voltage control circuit, electrically coupled to the high-voltage side, configured to detect the High Voltage Direct Current voltage and to output a second control signal according to the High Voltage Direct Current voltage;
    a low-voltage control circuit, electrically coupled to the low-voltage side, configured to detect the Low Voltage Direct Current voltage and to output a third control signal selectively according to the Low Voltage Direct Current voltage, or the Low Voltage Direct Current voltage and the first control signal, or the Low Voltage Direct Current voltage and the second control signal; and
    a driving circuit, electrically coupled to the low-voltage control circuit, configured to output a driving signal to drive the power converting circuit according to the third control signal.

2. The power converter of claim 1, wherein the low-voltage control circuit is further configured to receive a low-voltage command from a processing circuit, and to generate the third control signal selectively according to the low-voltage command and the Low Voltage Direct Current voltage, or according to the low-voltage command, the Low Voltage Direct Current voltage and the first control signal, or according to the low-voltage command, the Low Voltage Direct Current voltage and the second control signal.

3. The power converter of claim 2, wherein the low-voltage control circuit comprises:
a first voltage detection circuit, configured to detect the Low Voltage Direct Current voltage, so as to output a first voltage detection signal;
a first compensation circuit, electrically coupled between the first voltage detection circuit and the driving circuit, configured to receive the first voltage detection signal, or to receive sum of the first voltage detection signal and the first control signal, or to receive the sum of the first voltage detection signal and the second control signal; and
a first comparison amplifier, a first terminal of the first comparison amplifier configured to receive the low-voltage command, a second terminal of the first comparison amplifier electrically coupled to the first compensation circuit, an output terminal of the first comparison amplifier electrically coupled to the driving circuit.

4. The power converter of claim 2, wherein the low-voltage control circuit comprises:
a first voltage detection circuit, configured to detect the Low Voltage Direct Current voltage so as to output a first voltage detection signal;
a first compensation circuit, electrically coupled between the first voltage detection circuit and the driving circuit, configured to receive the first voltage detection signal, or to receive sum of the first voltage detection signal and the first control signal; and
a first comparison amplifier, a first terminal of the first comparison amplifier configured to receive the low-voltage command, or to receive sum of the low-voltage command and the second control signal, a second terminal of the first comparison amplifier electrically coupled to the first compensation circuit, an output terminal of the first comparison amplifier electrically coupled to the driving circuit.

5. The power converter of claim 1, wherein the output current control circuit is further configured to receive an output current command from a processing circuit, and to generate the first control signal to the low-voltage control circuit according to the output current command and the output current.

6. The power converter of claim 5, wherein the output current control circuit comprises:
a current detection circuit, configured to output an output current detection signal according to the output current;
a second compensation circuit, electrically coupled between the processing circuit and the low-voltage control circuit, configured to receive the output current command; and
a second comparison amplifier, a first terminal of the second comparison amplifier configured to receive the output current detection signal, a second terminal of the second comparison amplifier electrically coupled to the second compensation circuit, an output terminal of the second comparison amplifier electrically coupled to the low-voltage control circuit.

7. The power converter of claim 1, wherein the high-voltage control circuit is further configured to receive a high-voltage command from a processing circuit, and to generate the second control signal to the low-voltage control circuit according to the high-voltage command and the High Voltage Direct Current voltage.

8. The power converter of claim 7, wherein the high-voltage control circuit comprises:
a second voltage detection circuit, configured to detect the High Voltage Direct Current voltage so as to output a second voltage detection signal;
a third compensation circuit, electrically coupled between the second voltage detection circuit and the low-voltage control circuit, configured to receive the second voltage detection signal; and
a third comparison amplifier, a first terminal of the third comparison amplifier configured to receive the high-voltage command, a second terminal of the third comparison amplifier electrically coupled to the third compensation circuit, an output terminal of the third comparison amplifier electrically coupled to the low-voltage control circuit.

9. The power converter of claim 7, wherein the high-voltage control circuit comprises:
a second voltage detection circuit, configured to detect the High Voltage Direct Current voltage so as to output a second voltage detection signal;
a third compensation circuit, electrically coupled between the processing circuit and the low-voltage control circuit, configured to receive the high-voltage command; and
a third comparison amplifier, a first terminal of the third comparison amplifier configured to receive the second voltage detection signal, a second terminal of the third comparison amplifier electrically coupled to the third compensation circuit, an output terminal of the third comparison amplifier electrically coupled to the low-voltage control circuit.

10. The power converter of claim 1, further comprising:
a protection circuit, couple to the low-voltage side, the protection circuit configured to output a stop command to protect the power converting circuit when a reverse current is detected.

11. The power converter of claim 10, wherein the protection circuit comprises:
a reverse current detection circuit, coupled to the low-voltage side, the reverse current detection circuit configured to output a detection signal when the reverse current flowing from the low-voltage side to the power converting circuit is detected; and
a protection switch and a protection switch driver, coupled to the low-voltage side, the protection switch driver configured to output the stop command to turn off the protection switch when the detection signal is detected.

12. The power converter of claim 10, wherein the protection circuit comprises:
a reverse current detection circuit, coupled to the low-voltage side, the reverse current detection circuit configured to output a detection signal when the reverse current flowing from the low-voltage side to the power converting circuit is detected,
wherein the driving circuit configured to output a stop command to turn off a plurality of switches in the power converting circuit when the detection signal is received by the driving circuit.

13. A power converter, comprising:
a high-voltage side, configured to electrically couple with a High Voltage Direct Current source output;

a low-voltage side, configured to electrically couple with a Low Voltage Direct Current load;

a power converting circuit, configured to receive a High Voltage Direct Current voltage from the high-voltage side and to convert the High Voltage Direct Current voltage to a Low Voltage Direct Current voltage to the low-voltage side;

an output current control circuit, electrically coupled to the low-voltage side, configured to detect an output current of the power converting circuit and to output a first control signal according to the output current;

a high-voltage control circuit, electrically coupled to the high-voltage side, configured to detect the High Voltage Direct Current voltage and to output a second control signal according to the High Voltage Direct Current voltage;

a low-voltage control circuit, electrically coupled to the low-voltage side, configured to detect the Low Voltage Direct Current voltage and output a third control signal according to the Low Voltage Direct Current voltage; and a driving circuit, configured to selectively output a driving signal to drive the power converting circuit according to at least one of the first control signal, the second control signal or the third control signal.

14. The power converter of claim 13, wherein the high-voltage control circuit is further configured to receive a high-voltage command from a processing circuit and output the second control signal to the driving circuit according to the high-voltage command, and wherein the second control signal instructs driving circuit control the High Voltage Direct Current voltage to be regulated at a corresponding target voltage value.

15. The power converter of claim 14, wherein the high-voltage control circuit comprises:
  a first voltage divider circuit configured to divide the High Voltage Direct Current voltage and output a first voltage detecting signal;
  a first compensation circuit electrically coupled between the first voltage divider circuit and the driving circuit, wherein the first compensation circuit is configured to receive the first voltage detecting signal; and
  a first comparison amplifier comprising a first end of the first comparison amplifier electrically coupled to the first compensation circuit; a second end of the first comparison amplifier configured to receive the high-voltage command; and an output end of the first comparison amplifier electrically coupled to the driving circuit, wherein the output end of the first comparison amplifier is configured to output the second control signal to the driving circuit.

16. The power converter of claim 13, wherein the low-voltage control circuit is further configured to receive a low-voltage command from a processing circuit and output the third control signal to the driving circuit according to the low-voltage command, and wherein the third control signal instructs the driving circuit to control the Low Voltage Direct Current voltage to be regulated at a corresponding target voltage value.

17. The power converter of claim 16, wherein the low-voltage control circuit comprises:
  a second voltage divider circuit configured to divide the Low Voltage Direct Current voltage and output a second voltage detecting signal;
  a second compensation circuit electrically coupled between the second voltage divider circuit and the driving circuit, wherein the second compensation circuit is configured to receive the second voltage detecting signal; and
  a second comparison amplifier comprising a first end of the second comparison amplifier configured to receive the low-voltage command; a second end of the second comparison amplifier electrically coupled to the second compensation circuit; and an output end of the second comparison amplifier electrically coupled to the driving circuit, wherein the output end of the second comparison amplifier is configured to output the third control signal to the driving circuit.

18. The power converter of claim 13, wherein the output current control circuit is further configured to receive an output current command from a processing circuit and output the first control signal to the driving circuit according to the output current command, and wherein the first control signal instructs the driving circuit to control the output current to be regulated at a corresponding target voltage value.

19. The power converter of claim 18, wherein the output current control circuit comprises:
  a current detection circuit configured to output an output current detection signal according to the output current;
  a third compensation circuit electrically coupled between the current detection circuit and the driving circuit, wherein the third compensation circuit is configured to receive the output current detection signal; and
  a third comparison amplifier comprising a first end of the third comparison amplifier configured to receive the output current command; a second end of the third comparison amplifier electrically coupled to the third compensation circuit; and an output end of the third comparison amplifier electrically coupled to the driving circuit, wherein the output end of the third comparison amplifier is configured to output the first control signal to the driving circuit.

20. A power converter control method, comprising:
  converting, by a power converting circuit, a High Voltage Direct Current voltage from a high-voltage side to a Low Voltage Direct Current voltage, and outputting the Low Voltage Direct Current voltage to a low-voltage side;
  selectively activating, by a processing circuit, a low-voltage control circuit, or an output current control circuit and the low-voltage control circuit, or a high-voltage control circuit and the low-voltage control circuit;
  if the output current control circuit is activated, detecting, by the output current control circuit, an output current of the power converting circuit, and outputting a first control signal to the low-voltage control circuit according to the output current;
  if the high-voltage control circuit is activated, detecting, by the high-voltage control circuit, the High Voltage Direct Current voltage, and outputting a second control signal to the low-voltage control circuit according to the High Voltage Direct Current voltage;
  if the low-voltage control circuit is activated, detecting, by the low-voltage control circuit, the Low Voltage Direct Current voltage, and outputting a third control signal; and
  outputting, by a driving circuit, a driving signal according to the third control signal to drive the power converting circuit, and controlling the Low Voltage Direct Current voltage, the High Voltage Direct Current voltage or the output current corresponding to the third control signal.

* * * * *